United States Patent
Lindberg et al.

(10) Patent No.: US 6,169,737 B1
(45) Date of Patent: Jan. 2, 2001

(54) ESTABLISHING TELECOMMUNICATION CONNECTIONS

(75) Inventors: Mikeal Lindberg, Täby; Ulf Hansson, Huddinge; Fredrik Olsson, Trångsund, all of (SE)

(73) Assignee: Telefonaktiebolaget LM Ericsson (publ), Stockholm (SE)

( * ) Notice: Under 35 U.S.C. 154(b), the term of this patent shall be extended for 0 days.

(21) Appl. No.: 09/035,757

(22) Filed: Mar. 6, 1998

(30) Foreign Application Priority Data

Mar. 10, 1997 (SE) .................................................. 9700850

(51) Int. Cl.[7] .................................................. H04Q 11/00
(52) U.S. Cl. .......................... 370/376; 370/375; 370/360; 370/357
(58) Field of Search .................................... 370/376, 375, 370/360, 357

(56) References Cited

U.S. PATENT DOCUMENTS 3,927,267 * 12/1975 Voyer et al. .......................... 370/371
4,543,652 * 9/1985 Amada et al. ........................ 370/368
4,858,227 * 8/1989 Ratcliff ................................. 370/374

FOREIGN PATENT DOCUMENTS 0 229 365   12/1986 (EP).

* cited by examiner

*Primary Examiner*—Huy D. Vu
*Assistant Examiner*—Dung Trinh
(74) *Attorney, Agent, or Firm*—Burns, Doane, Swecker & Mathis, L.L.P.

(57) ABSTRACT

The invention relates to a method and device for switching user data, belonging to a connection, between different time slots in a switch or a switch stage such that sequence and frame integrity are preserved. According to the invention, an efficient algorithm is utilized for determining distribution information, in form of storage positions in one or more control memories in the switch. User data is caused to be switched, according to this distribution information from the algorithm, such that these user data maintain the same reciprocal time order through the switch or switch stage. The distribution information determined by the algorithm assures sequence integrity and at the same time minimizes the delay of user data through the switch and/or switch stage. The algorithm also generates control information in form of delay values for delaying some user data such that data belonging to incoming time slots in one and the same frame are assigned to outgoing time slots in the same frame.

24 Claims, 13 Drawing Sheets

OFFSET-VARIABLE δ = 0

| DATA | POSITION | DATA | POSITION |
|---|---|---|---|
| $t_{in}[0]$ → | $45.t_{int}[0]$ | $t_{out}[0]$ → | $46.t_{int}[0]$ |
| $t_{in}[1]$ → | $45.t_{int}[1]$ | $t_{out}[1]$ → | $46.t_{int}[1]$ |
| $t_{in}[2]$ → | $45.t_{int}[2]$ | $t_{out}[2]$ → | $46.t_{int}[2]$ |
| $t_{in}[3]$ → | $45.t_{int}[3]$ | $t_{out}[3]$ → | $46.t_{int}[3]$ |

OFFSET-VARIABLE δ = 1

| DATA | POSITION | DATA | POSITION |
|---|---|---|---|
| $t_{in}[0]$ | $45.t_{int}[0]$ | $t_{out}[0]$ | $46.t_{int}[0]$ |
| $t_{in}[1]$ | $45.t_{int}[1]$ | $t_{out}[1]$ | $46.t_{int}[1]$ |
| $t_{in}[2]$ | $45.t_{int}[2]$ | $t_{out}[2]$ | $46.t_{int}[2]$ |
| $t_{in}[3]$ | $45.t_{int}[3]$ | $t_{out}[3]$ | $46.t_{int}[3]$ |

OFFSET-VARIABLE δ = 2

| DATA | POSITION | DATA | POSITION |
|---|---|---|---|
| $t_{in}[0]$ | $45.t_{int}[0]$ | $t_{out}[0]$ | $46.t_{int}[0]$ |
| $t_{in}[1]$ | $45.t_{int}[1]$ | $t_{out}[1]$ | $46.t_{int}[1]$ |
| $t_{in}[2]$ | $45.t_{int}[2]$ | $t_{out}[2]$ | $46.t_{int}[2]$ |
| $t_{in}[3]$ | $45.t_{int}[3]$ | $t_{out}[3]$ | $46.t_{int}[3]$ |

*Figure 7b* ical field of the invention

The invention relates to switching of user data through a switch or a switch stage. In particular, the invention relates to a method and device for switching user data, belonging to a connection, between different time slots in the switch or switch stage.

BACKGROUND OF THE INVENTION

User data switched through a digital switch belong to channels, so called connections. In the switch, user data originating from each connection from a respective input in the switch are switched to a respective selectable output in the switch. A technique used in connection thereto is circuit switching. A common switch structure in circuit switching is called "Time Space Time" (TST). In switches having this structure, a plurality of time switch stages are connected to a space switch stage. User data is first switched through an incoming time switch stage, then through a space switch stage and finally through an outgoing time switch stage.

User data from several connections that are to be switched through a switch of TST-structure are multiplexed by means of time multiplexing. In time multiplexing, the user data is placed in time slots that are arranged in frames. In switching the user data through the switch, it is moved between different time slots and frames. This is accomplished by delaying the user data in memories, so called speech memories, in the time switch stages of the switch. A speech memory comprises storage positions for storing user data. Each storage position corresponds to a time slot and stores, during a certain time, a data word of the user data, such as a byte. In addition to the speech memories, the time switch stages also include control memories and time slot counters by means of which writing of the user data into, and reading of the user data out of the speech memories are performed in different time slots. A control memory also includes storage positions, each of which corresponds to a time slot. A time slot counter cyclically addresses storage positions in the control memory as well as in the speech memory. For each time slot, a storage position in the control memory is addressed for reading control information stored in the control memory. The control information in the control memories in turn addresses the speech memories for reading the user data from the incoming time switch stages on one hand, and for writing the user data into the outgoing time switch stages on the other hand.

User data arriving to an incoming time switch stage appears in incoming time slots. In the space switch stage, the user data is placed by the incoming time switch stage in so called internal time slots. The user data going out from an outgoing time switch stage is placed by the outgoing time switch stage in outgoing time slots. Conflict in the space switch stage is avoided by means of the internal time slots.

Control information is generated in a control system, such as a computer program-controlled control system, being part of the telecommunication system. The control system is connected to the switch. Writing of control information into the control memories is instructed from the control system for assigning time slots used in the switching of the user data through the switch.

In one type of connection, a so called narrowband connection, user data arrives in a single incoming time slot each frame. User data are delayed differently for different narrowband connections. For each narrowband connection, the delay depends on in which incoming time slots that user data arrives to the switch, and in which internal time slots and outgoing time slots that user data for the narrowband connection are switched through the switch. The reciprocal timing relations between the incoming time slots, the internal time slots and the outgoing time slots for a narrowband connection determines the delay of the user data belonging to the narrowband connection.

Another type of connection, a so called wideband connection, occupies several time slots in each frame. User data belonging to a wideband connection arrives in several incoming time slots in each frame, and is switched through the switch in several internal time slots and in several outgoing time slots, in a sense as several separate narrowband connections. Thus, a wideband connection may be considered as an association of several narrowband connections. User data belonging to a wideband connection will consequently be switched through the switch in several narrowband connections with different delays.

A problem in connection thereto is to obtain sequence integrity, so called Time Slot Sequence Integrity (TSSI), and frame integrity, so called Time Slot Frame Integrity (TSFI), for wideband connections, i.e. to assure that data words constituting user data for a wideband connection maintain one and the same reciprocal time order through the switch on one hand, and that those data words that arrive in incoming time slots in one and the same frame are placed in the same frame in outgoing time slots on the other hand.

If as an example frame integrity (TSFI) is not preserved through the switch, then the user terminals in some telecommunication applications have to be equipped with frame analysis and frame regeneration equipment. This means an undesirable increased cost for the users.

SUMMARY OF THE INVENTION

An object of the invention is to find a simple way of obtaining sequence integrity (TSSI) and frame integrity (TSFI) in switching connections through a switch or a switch stage.

In particular, a main object of the invention is to provide a method and device for switching user data, belonging to a connection, between different time slots in a switch or a switch stage such that sequence and frame integrity are preserved.

A further object of the invention is the provision of a simple and effective algorithm for determining information that controls the distribution of user data between different time slots such that the reciprocal time order for user data (sequence integrity) is preserved through the switch or switch stage. It is also desirable that the time delay through the switch stage or stages becomes as small as possible.

Yet another object of the invention is to extend the algorithm such that it also determines control information, in form of delay values, that controls the delay of the user data through the switch or switch stage so that frame integrity is preserved.

These objects are met by the invention as defined by the accompanying patent claims.

User data belonging to a connection, preferably of wideband type, is distributed among the internal time slots in each frame that have been assigned to the wideband connection for switching the user data through the switch on one hand, and among the outgoing time slots in each frame that have been assigned to the wideband connection for switching the user data through the switch on the other hand.

According to the invention, an algorithm is used for determining information utilized in connection with the preservation of sequence and frame integrity. The algorithm includes two parts. The first part of the algorithm is associated with the preservation of sequence integrity through a time switch stage. The first part in combination with the second part of the algorithm is associated with the preservation of both sequence and frame integrity through the switch.

In particular, the first part of the algorithm is used for determining distribution information, in form of storage positions in a control memory in the switch. Data words that constitute user data are caused to be switched according to the distribution information from the first part of the algorithm through a time switch stage such that the data words maintain one and the same reciprocal time order through the switch stage. The distribution information determined by the first part of the algorithm assures sequence integrity and at the same time minimizes the delay of user data through the switch stage.

In a TST-switch as an example, the first part of the algorithm can be applied to the incoming time stage for preserving the sequence integrity therethrough. Next, a corresponding algorithm part can be used on the outgoing time stage for preserving the sequence integrity through this stage also. Consequently, the first part of the algorithm can be utilized independently from the second part of the algorithm to preserve sequence integrity through a switch stage or through a complete switch.

However, the preferred embodiment implies that both the first and the second part of the algorithm are applied to preserve both sequence and frame integrity through a switch.

In particular, the second part of the algorithm generates control information, in form of delay values, for delaying user data such that data words associated with incoming time slots in one and the same frame are assigned to outgoing time slots in the same frame. Preferably, the control memory in the switch stage in question is extended and the generated delay values are stored in the extended part of this control memory. In the best embodiment of the invention, the delay values are made up of a single bit per time slot.

According to an embodiment of the invention, the speech memory in a switch stage of the switch is also extended such that it includes storage positions that in number correspond to the number of time slots in two frames. These storage positions are arranged in two memory parts of equal size in the speech memory. Furthermore, a delay control unit is provided in the time switch stage for generating delay information based on the control information, inter alia the generated delay values, in the control memory of the switch stage and a determined part of the counter information from a time slot counter circuit. This delay information controls, for each time slot, to/from (depending on whether the speech memory is provided in an outgoing stage or an incoming stage) which one of the first and second part of the speech memory that user data is to be switched. Here, the first part of the speech memory corresponds to a first frame of time slots, and the second part of the speech memory corresponds to a following second frame of time slots.

Consequently, user data is delayed to obtain frame integrity (TSFI) up to a time corresponding to two frames in the incoming or outgoing time switch stages, whereby the data words are caused to appear in either earliest possible frames or in subsequently following frames in accordance with the delay values or last of all in accordance with the delay information generated by the delay control unit.

The invention has the following advantages:

sequence integrity is easily preserved through a switch stage or through a switch;

both sequence and frame integrity can be preserved through the switch;

the delay mechanism for obtaining sequence and frame integrity just needs to be performed on one side of the switch, whereby the delay is minimized;

the delay information determined by the algorithm minimizes the delay of user data through the switch stage and/or the switch;

the extra control information in form of delay values can be realized by a single bit per time slot, facilitating the logic implementation and minimizing the extra memory space required in the control memory;

the number of memory accesses does not increase; and the solution is integrated in the switch structure itself.

BRIEF DESCRIPTION OF THE DRAWINGS

The invention will now be described in more detail with reference to the drawings, in which:

FIG. 7b illustrates how the determined offset-variable influences the distribution of incoming time slot numbers and outgoing time slot numbers to the storage positions in the respective control memory;

DESCRIPTION OF ILLUSTRATIVE EMBODIMENTS

User terminals (not shown), such as telephones and computers, generate and receive user data. It should be understood that "user terminals" also means internal equipment of a telecommunication system that generates and/or receives data, such as trunks, tone senders, tone receivers and conference units. The user data is made up of data words of e.g. 8 bits. User data to or from a group of user terminals appear by means of time multiplexing in one and the same so called multiplex in time intervals referred to as time slots, which in turn are part of larger time intervals, of 125 ms, referred to as PCM-frames or for simplicity just frames. User data generated by a user terminal and received by a (normally another) user terminal is associated with a so called connection that is unique for the user data. A multiplex thus includes user data from a plurality of connections. User data belonging to a connection is arranged in one or more time slots in each frame, where the timing relations of the time slots to their respective frames do not change between successive frames. The frames constitute time references by means of which the user data is associated to the connections.

Figure 1:
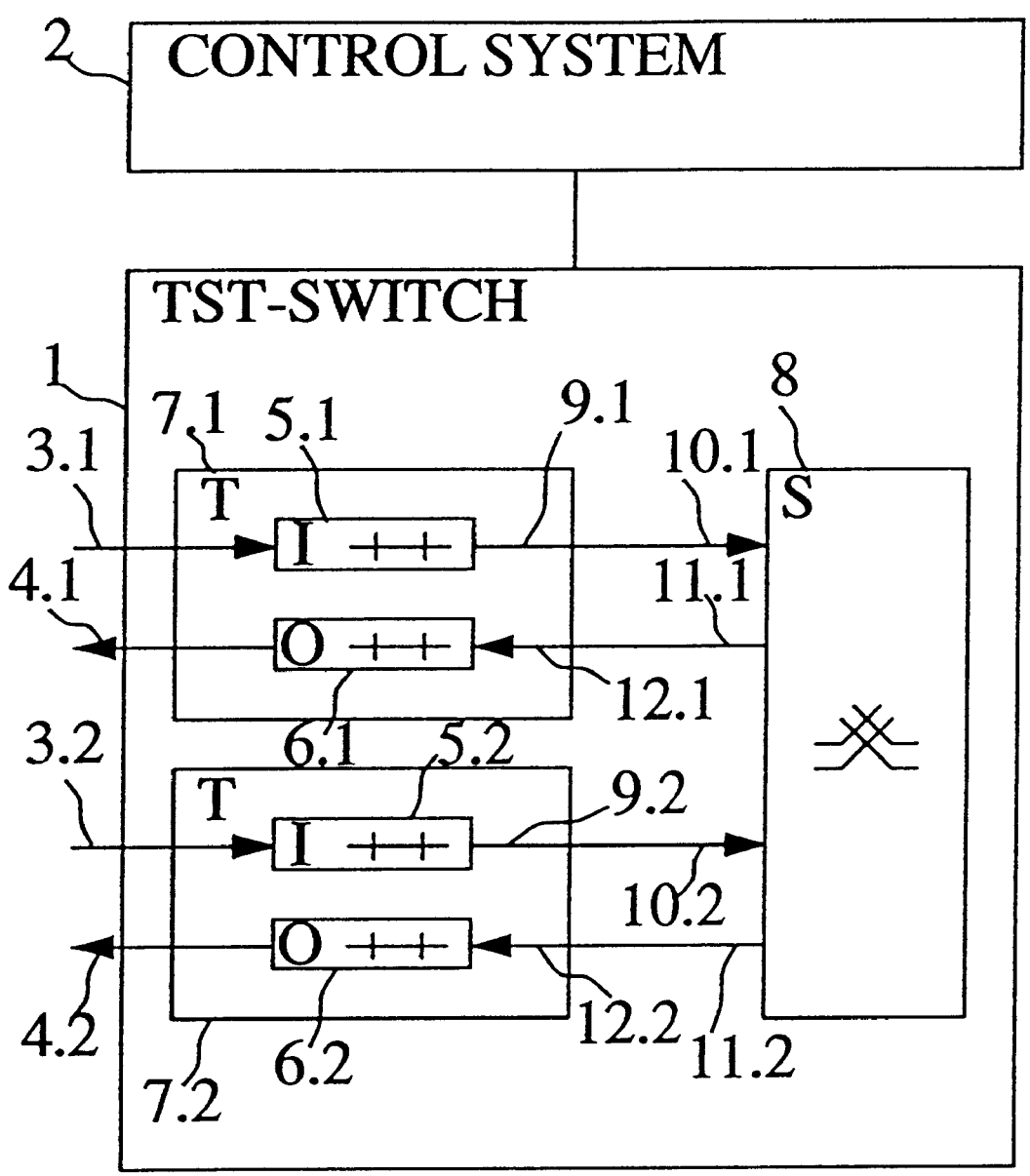
FIG. 1 schematically shows a circuit-switching switch having TST-structure and a control system.

In FIG. 1 there is shown a telecommunication system having a circuit-switching switch 1 of the type "Time-Space-Time", a so called TST-switch, and a control system 2 connected to the switch. The switch 1 has a number of inputs 3.n and a number of outputs 4.n. For simplicity, only two inputs 3.1, 3.2 and two outputs 4.1, 4.2 are shown. The switch 1 further includes incoming time switch stages 5.n and outgoing time switch stages 6.n, which in pairs form part of time switch modules 7.n, and a space switch stage 8. For simplicity only two incoming time switch stages 5.1, 5.2 and two outgoing time switch stages 6.1, 6.2 are shown.

Each input 3.n is connected to a respective incoming time switch stage 5.n. To each outgoing time switch stage 6.n a respective output 4.n is connected. An input 3.n and an output 4.n that are connected to an incoming time switch stage 5.n and an outgoing time switch stage 6.n, respectively, in the same time switch module 7.n are associated to multiplexes that normally belong to the same group of user terminals. Outputs 9.n from the incoming time switch stages are connected to inputs 10.n of the space switch stage 8.n. Outputs 11.n of the space switch stage are connected to inputs 12.n of the outgoing time switch stages 6.n. The connections appear more closely from the figure for outputs 9.1, 9.2, 11.1, 11.2 and inputs 10.1, 10.2, 12.1, 12.2.

Figure 2A:
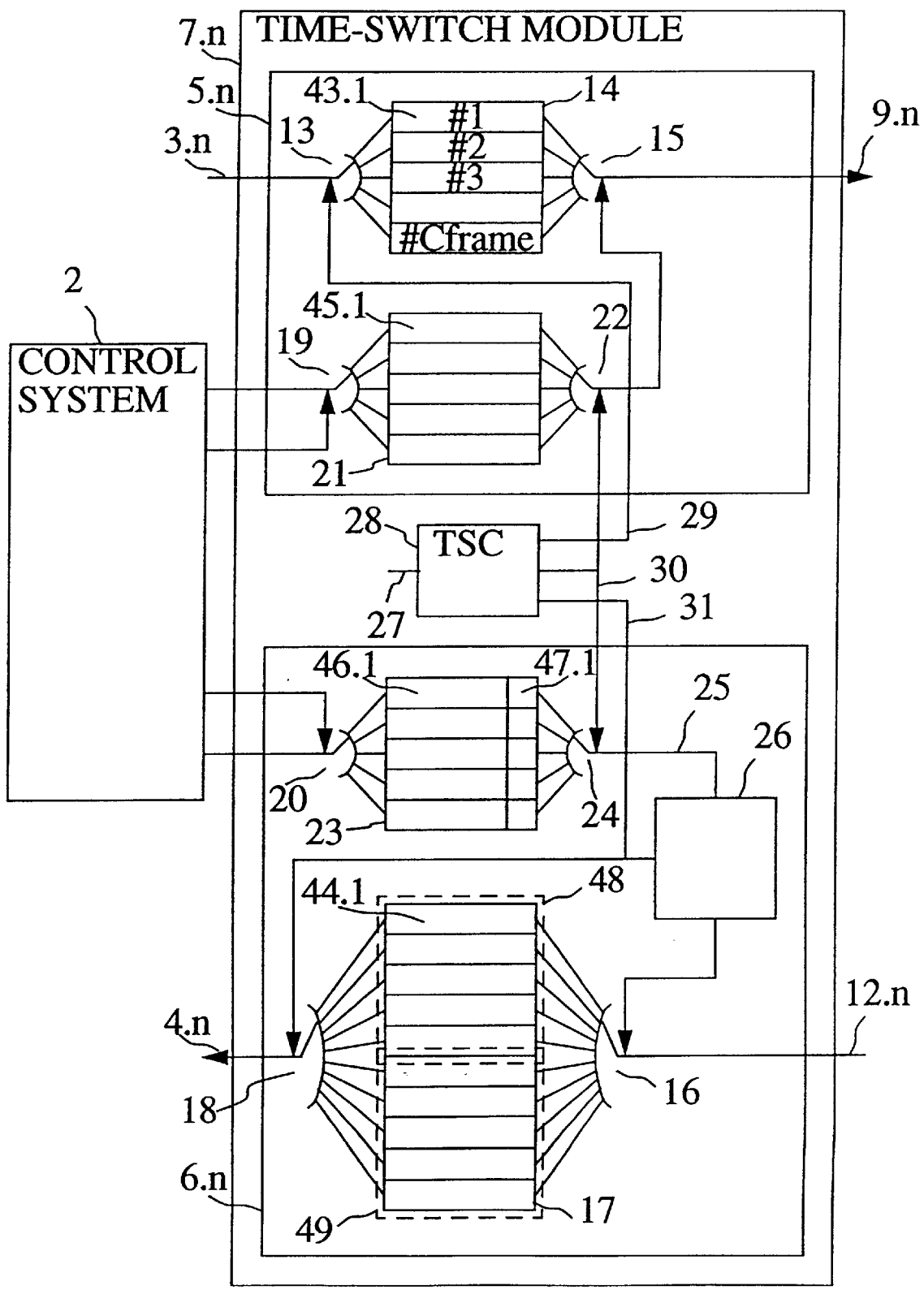
FIG. 2a shows a control system and a time switch module with an outgoing time switch stage according to the invention.

In FIG. 2a, a time switch module 7.n and the control system 2 are shown. The control system 2 is shown in general, whereas the time switch module 7.n is shown in more detail. The time switch module 7.n comprises an incoming time switch stage 5.n and an outgoing time switch stage 6.n. The input 3.n, on which a multiplex is arriving from a group of user terminals, is connected to an addressing unit 13, which in turn is connected to a speech memory 14. The speech memory 14 is connected to an addressing unit 15 that is connected to the output 9.n. The input 12.n is connected to an addressing unit 16, which in turn is connected to a speech memory 17. The speech memory 17 is connected to an addressing unit 18, which in turn is connected to the output 4.n. The control system 2 is connected to addressing units 19 and 20. The addressing unit 19 is connected to a control memory 21. The control memory 21 is connected to an addressing unit 22. The addressing unit 22 is connected to the addressing unit 15. The addressing unit 20 is connected to a control memory 23. The control memory 23 is in turn connected to an addressing unit 24. An output 25 of the addressing unit 24 is connected to a delay control unit 26 which in turn is connected to the addressing unit 16. On an input 27, a clock signal is coming from a per se known and therefore not shown clock for generating clock pulses, each of which corresponds to a time slot. The input 27 is connected to a time slot counter (TSC) 28. The time slot counter 28 is connected, via different outputs 29, 30 and 31, to the addressing units 13, 18, 22, 24 on one hand and to the delay control unit 26 on the other hand.

Figure 3:
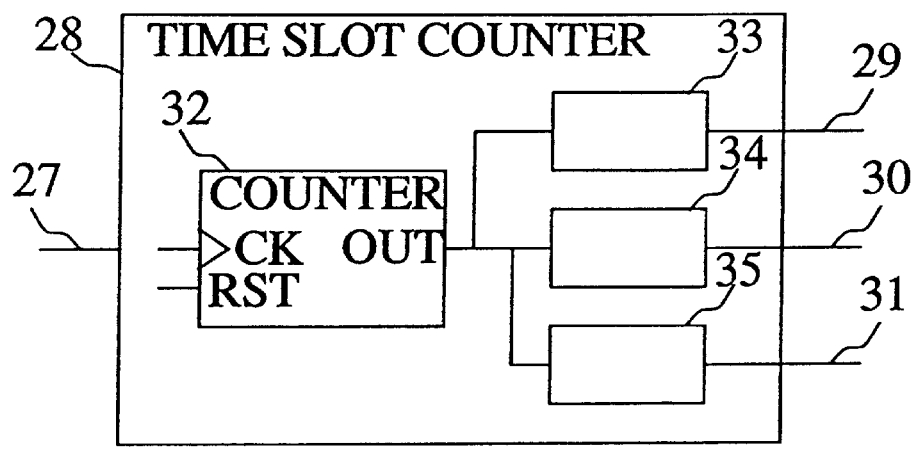
FIG. 3 shows a time slot counter circuit according to the invention.

The time slot counter 28 is shown in closer detail in FIG. 3. Except for a counter 32, per se known, the time slot counter 28 also includes means 33, means 34 and means 35 to which the counter 32 is connected. The output 29 is associated with means 33 and connected to the addressing unit 13. The output 30 is associated with means 34 and connected to the addressing unit 22 on one hand and to the addressing unit 24 on the other hand. The output 31 is associated with means 35 and connected to the addressing unit 18 on one hand and to the delay control unit 26 on the other hand. The function of means 33, 34 and 35 will be described later on.

Figure 4:
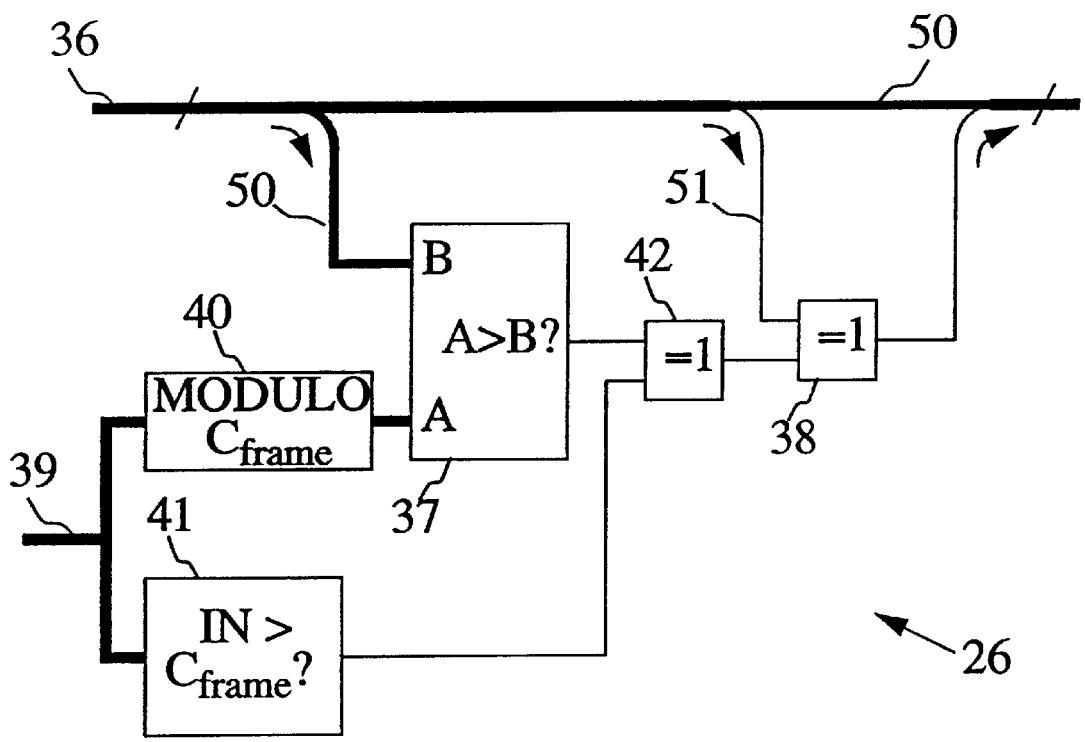
FIG. 4 shows a delay control unit according to the invention.

The delay control unit 26 is shown in more detail in FIG. 4. An input 36 to the delay control unit 26 from the output 25 of the addressing unit 24 is connected partly to a first input of a first comparator 37 on one hand, and partly to a first input of a first XOR-gate 38 on the other hand. An input 39 to the delay control unit 26 from the output 31 of means 35 in the time slot counter 28 is connected to means 40 on one hand and to a second comparator 41 on the other hand. Means 40 is connected to a second input of the first comparator 37. The first comparator 37 and the second comparator 41 are connected to a respective input of a second XOR-gate 42. The output from the second XOR-gate 42 is connected to a second input of the first XOR-gate 38. The first XOR-gate 38 is in turn connected to the addressing unit 16. Further, the output 25 from the addressing unit 24 is partly connected to the addressing unit 16 via the delay control unit 26.

Referring once again to FIGS. 1 and 2a. The user data in the respective connection is switched through the switch 1 from an input 3.n to a selectable output 4.n. In this respect, time switching in the time switch stages 5.n, 6.n as well as space switching in the space switch stage 8 are performed. The time switching means that user data arriving to a time switch stage 5.n, 6.n in given time slots relative to the frames are delayed and goes out of the time switch stage 5.n, 6.n in other time slots relative to the frames. In space switching, physical connections such as galvanic connections, are established from the inputs 10.n of the space switch stage to the outputs 11.n thereof. Space switching means that user data arriving to the space switch stage 8 on an input 10.n, e.g. 10.7 (not shown), goes out of the space switch stage 8 from a selectable output 11.n, e.g. 11.3 (not shown).

In switching user data belonging to a connection through the switch 1, the user data arrives in one or more given time slots in each frame, in so called incoming time slots, to an incoming time switch stage 5.n. In the incoming time slots, the user data is written into the speech memory 14 (FIG. 2a). The user data is read out of the speech memory 14 in other time slots, in so called internal time slots. The user data thus appearing in internal time slots is physically switched through the space switch stage 8 (FIG. 1) and written, in the internal time slots, into the speech memory 17 (FIG. 2a) of an outgoing time switch stage 6.n. In yet other time slots, so called outgoing time slots, the user data is read out of the speech memory 17.

The writing and reading of user data into and out of the speech memories 14, 17 are controlled by the addressing units 13, 15, 16, 18, which in turn are controlled by the time slot counter 28 and by the control system 2 through the addressing units 19, 20, 22, 24, the control memories 21, 23 and the delay control unit 26.

By means of the time slot counter 28, via the addressing unit 13, user data is cyclically written into storage positions 43.n in the speech memory 14 in a fixed sequence. The number of storage positions 43.n in the speech memory 14 is equal to the number of time slots in a frame. For simplicity, 5 storage positions 43.1–43.5 (however, only reference number 43.1 is shown in FIG. 2a) are shown, which correspond to 5 time slots in a frame. In reality however, the number of time slots in each frame is in general substantially greater, 512 as an example. Each storage position 43.n represents one and only one unique time slot in each frame. User data arriving in a certain incoming time slot in a frame is consequently stored in a given storage position 43.n corresponding to the incoming time slot. The read-out of user data from the speech memory 17 into outgoing time slots is performed in a similar way. However, in the speech memory 17 there are twice as many storage positions 44.n as in the speech memory 14, i.e. as many storage positions 44.n as time slots in two frames. In the speech memory 17, 10 storage positions 44.1–44.10 (however, only reference number 44.1 is shown in FIG. 2a) are shown. The read-out of the user data is performed cyclically in a fixed sequence, one storage position 44.n each outgoing time slot such that each time slot represents a given outgoing time slot in every second frame. Consequently, user data can be switched to a time slot in an earliest possible outgoing frame or in a subsequently following outgoing frame.

User data that is assigned a storage position 44.n may selectively be delayed up to a time corresponding to two frames, depending on the value of the time slot counter 28 at the time for writing of the user data and in which storage position 44.n (the addressing information to the addressing unit 16) that writing of the user data is performed.

Now with reference to FIG. 3. The counter 32 that forms part of the time slot counter 28 cyclically occupies different states in a counter sequence such that different counter values are taken. The number of different counter values taken by the counter 32 is equal to the number of time slots in two frames. For each time slot in the two frames, a unique counter value is taken.

In means 33 and 35 values with a so called offset from the counter values are generated. In the respective means 33, 35 a value, called phase value, is generated for each counter value. Phase values obtained by means 33 have a difference compared to the counter values, representing a difference in phase between frames for internal time slots and frames for incoming time slots. Phase values obtained by means 35, at the output 31, have a difference compared to the counter values, representing a difference in phase between frames for outgoing time slots and frames for internal time slots. In the following, a phase value at the output 31 is also called an outgoing phase value. By means of the phase values, the switch handles reciprocal phase differences between frames for incoming time slots, frames for internal time slots and frames for outgoing time slots.

In means 33 and 34 modulo operations are performed. In means 34 a modulo operation between the counter value and a value representing the number of time slots in a frame is performed. By means of the modulo operation, a sequence of read-out counter values, in number equal to the number of time slots in a single frame but repeated twice for each counter sequence from the counter 32, is cyclically generated at the output 30 of means 34. In means 33 a modulo operation between the phase value and the value representing the number of time slots in a frame is performed. In that way, counter values similar to those from means 34, but with an offset, are generated at the output 29 of means 33. In practice, the modulo operations imply that the most significant bit of the counter values or phase values is eliminated.

By means of the control system 2 (FIGS. 1 and 2a), control information for controlling the switch 1 is generated. The control information comprises data words of e.g. 12 bits on one hand, and single bits on the other hand. The data words are written into storage positions 45.n and 46.n in the control memories 21 and 23, respectively, and the single bits are written into storage positions 47.n in the control memory 23, 1 bit per storage position 47.n, for controlling the switch 1. The bits in the storage positions 47.n are called delay values or delay bits in the following. The number of storage positions 45.n, 46.n, 47.n of respective type is equal to the number of time slots in a frame. The number of storage positions 45.n, 46.n, 47.n of each type shown is therefore equal to 5. By means of the time slot counter 28, via the addressing units 22, 24, control information is read out of a storage position 45.n, 46.n, 47.n in respective control memories 21, 23 in each time slot. Read-out is performed cyclically in a fixed sequence, one unique storage position 45.n, 46.n, 47.n for the respective time slot in a frame. Thus, each storage position 45.n, 46.n, 47.n implicitly corresponds to one and only one time slot in each frame.

Control information indicating from which storage position in the speech memory that user data is to be read, and in that way appear in internal time slots, is read out from the control memory 21 in each time slot. Control information indicating in which outgoing time slot in a frame that read-out of the user data is to be performed on one hand and if the user data is to be read out in a first possible frame or to be delayed an extra frame on the other hand, is read from the control memory 23 in each internal time slot.

The delay control unit 26 (FIG. 4) generates, from the control information from the control memory 23, via the addressing unit 24, and from information from the time slot counter 28, addressing information to the addressing unit 16 for writing the user data into the speech memory 17. In unit 26, the control information from the control memory 23 is compared to the information from the time slot counter 28. The outcome of the comparison results in user data being written, via the addressing unit 16, into storage positions 44.n either in a first part 48 of the speech memory 17 or in a second part 49 of the speech memory 17.

The delay control unit 26 receives the control information from the storage positions 46.n, 47.n in the control memory 23 at the input 36. The control information in the storage positions 46.n is directly applied to the addressing unit 16, and forms a first part 50 of the addressing information. The control information in the storage positions 46.n is also applied to the first input of the first comparator 37. The input 39 is provided with the phase values from the unit 35 which also controls the addressing unit 18 for reading out the user data into the outgoing time slots. Via unit 40, which performs a modulo operation between phase values from the unit 35 and a value representing the number of time slots in a frame, the second input of the first comparator 37 is provided with comparison values A representing outgoing time slots in each frame.

If, in a time slot, a comparison value A is greater than the control information, i.e. a value B from a storage position 46.n in the control memory 23, a bit which constitutes output data of the output of the first comparator 37 is set to "1".

On the other hand, if the comparison value A is less than or equal to the control information B, the bit is set to "0". The bit indicates, if it is set to "1", that i. if writing of user data takes place in the first part 48 of the speech memory 17, and read-out of user data also takes place in the first part 48 of the speech memory 17, or ii. if writing of user data takes place in the second part 49 of the speech memory 17, and read-out of user data also takes place in the second part 49 of the speech memory 17, then the user data is delayed more than one frame, otherwise not.

In the second comparator 41, the outgoing phase value is compared to a value representing the number of time slots in a frame. If the outgoing phase value is greater than the number of time slots in a frame, then a bit that constitutes output data of the output from the second comparator 41 is set to "1". On the other hand, if the outgoing phase value is less than or equal to the number of time slots in a frame, then the bit is set to "0". The bit indicates, if it is set to "1", that read-out of user data in the current time slot is performed from the second part 49 of the speech memory 17. If the bit is instead set to "0", it indicates that read-out of user data is performed from the first part 48 of the speech memory 17.

A first XOR-operation is performed in the second XOR-gate 42 between the bit from the first comparator 37 and the bit from the second comparator 41. The result of the first XOR-operation is a bit at the output of the second XOR-gate 42 which indicates, if it is set to "1", that writing of user data into the first part 48 of the speech memory 17 in the current time slot results in user data being delayed more than one frame. If it instead is set to "0", it indicates that writing into the second part 49 of the speech memory 17 in the current time slot results in user data being delayed more than one frame.

A second XOR-operation is performed in the first XOR-gate 38 between the bit from the output of the second XOR-gate 42 and a delay bit from a storage position 47.n. Delay bits from the storage positions 47.n constitute a second part 51 of the addressing information. A delay bit indicates, if it is set to "0", that user data is to be placed in that part of the speech memory 17, i.e. in the first part 48 or in the second part 49, that implies that user data is to be read out in time slots in a first possible frame for outgoing time slots. On the other hand, if the delay bit is set to "1", it indicates that user data is to be placed in that part of the speech memory 17 that implies that the user data is read out in time slots in a subsequently following frame.

A bit, so called delay information, at the output of the first XOR-gate 38 indicates, if it is set to "0", that user data is to be written into the first part 48 of the speech memory 17, whereas, if set to "1", it indicates that user data is to be written into the second part 49 of the speech memory 17. The delay information in form of a bit from the output of the first XOR-gate 38 controls the addressing unit 16 such that writing of the user data takes place either in the first part 48 of the speech memory 17 or in the second part 49 of the speech memory 17, based on the control information in the storage positions 46.n, 47.n in the control memory 23, and based on the outgoing phase value from the time slot counter 28.

In a so called narrowband connection, the user data for the connection appears in a single incoming time slot each frame, an internal time slot each frame and an outgoing time slot each frame. The control information for the narrowband connection is written into a storage position 45.n, and into a storage position 46.n, 47.n. The storage positions 45.n, 46.n, 47.n correspond to the internal time slots. The control information in the storage positions 45.n indicates from which incoming time slots that user data is to be switched to the internal time slots, i.e. out of which storage position 43.n that user data is to be read from the speech memory 14. The control information in the storage position 46.n, 47.n indicates to which outgoing time slots that user data is to be switched from the internal time slots, i.e. in which storage position 44.n that user data is to be written into the speech memory 17 such that read-out of the user data takes place in outgoing time slots for the connection. Consequently, the control information associated with a narrowband connection includes a value indicating in which incoming time slot the user data arrives to the switch, a value indicating in which internal time slot the user data is switched through the space switch stage, and a value indicating in which outgoing time slot the user data goes out of the switch. In the following, these values representing determined timing relations to the frames are called incoming time slot numbers, internal time slot numbers and outgoing time slot numbers, respectively. In addition to time slot numbers, the control information for a narrowband connection includes a constant delay value for each time slot, which is written into the storage position 47.n. The value indicates that the user data goes out of the switch in earliest possible frames.

In a so called wideband connection, the user data for the connection is switched in several incoming time slots each frame, in several internal time slots each frame and in several outgoing time slots each frame, in principle as several narrowband connections. Control information for controlling the switch for a wideband connection thus includes several incoming time slot numbers, several internal time slot numbers and several outgoing time slot numbers. In addition thereto, the control information includes delay values, one for each time slot in a frame for the wideband connection, which indicate whether user data is to appear in earliest possible frames or to be delayed an extra frame in the outgoing time switch stage. These values are written into the storage positions 47.n.

Figure 2B:
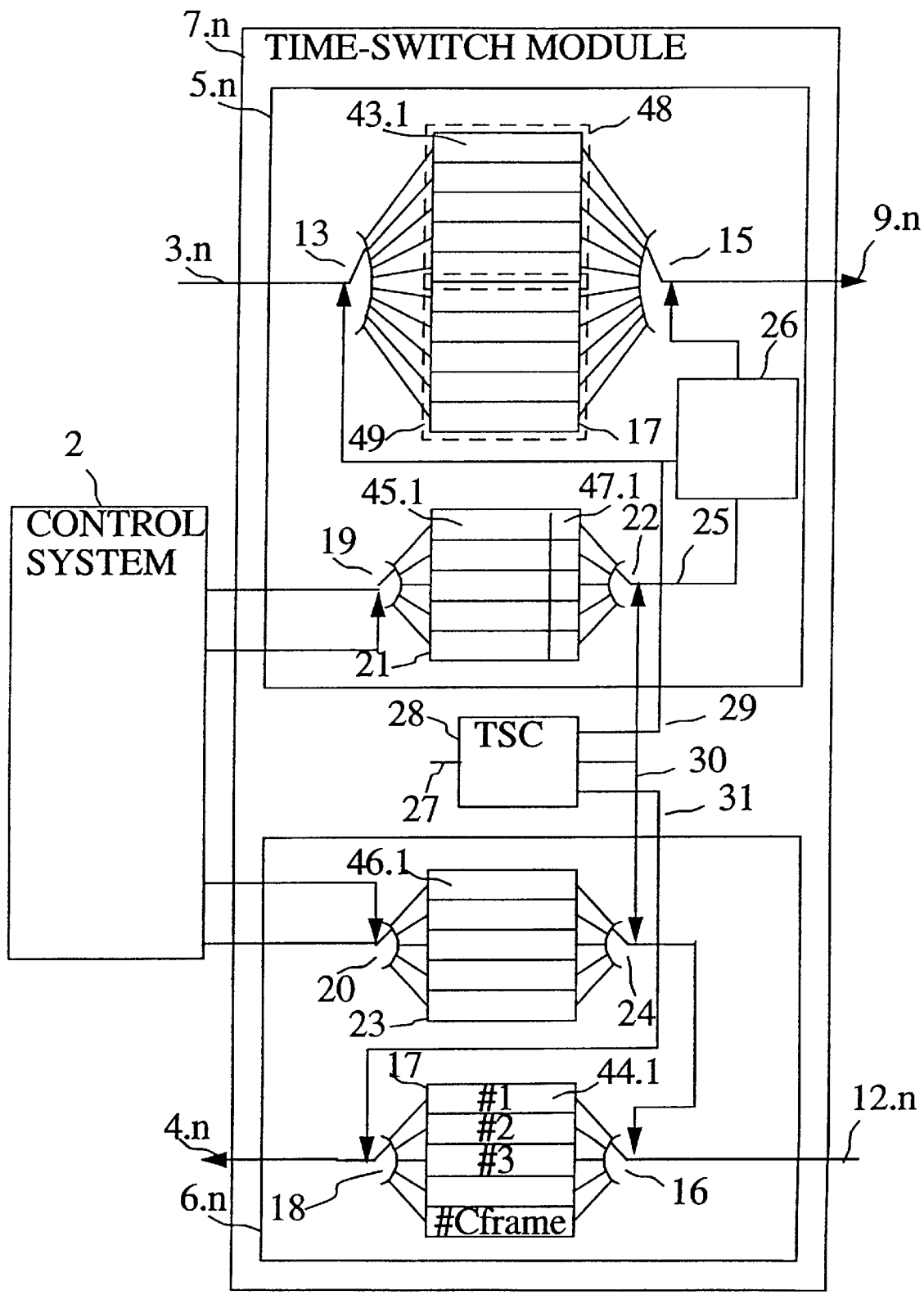
FIG. 2b shows a control system and a time switch module with an incoming time switch stage according to the invention.

It should be understood that this aspect of the invention also is applicable to the incoming time switch stage. With reference to FIG. 2b, there is shown a switch structure in form of a time switch module 7.n to which a control system 2 is connected. The same reference numerals as in FIG. 2a are used to designate the same or corresponding elements. The difference compared to FIG. 2a is that the invention is applied to the incoming time switch stage 5.n. The speech memory 14 is extended to include two parts 48 and 49 (for simplicity, the same reference numerals as in FIG. 2a are used), each of which contains storage positions that in number correspond to the number of time slots in a frame. The control memory 21 is also extended such that it includes control information in the storage positions 45.n and control information in form of delay values in the positions 47.n. The control information from the control memory 21 in the incoming time switch stage 5.n is fed, via the addressing unit 22, to the delay control unit 26 which, in this embodiment, is connected to the addressing unit 15 to control the read-out of user data from the extended speech memory 14. The delay control unit 26 functions in a way corresponding to that of FIG. 2a, and here the time slot counter information at the output 29 corresponds to the information from means 35 in FIG. 2a. In particular, the delay control unit generates delay information that controls, for each internal time slot, from which of the first part 48 and the second part 49 of the speech memory 14 that user data is to be switched to the internal time slot. It should be noted that according to FIG. 2a, the delay control unit 26 controls the storage of user data in the extended speech memory 17, whereas according to FIG. 2b, the delay control unit 26 controls the read-out of user data from the extended speech memory 14. In FIG. 2b, the outgoing time switch stage 6.n includes a control memory 23 with control information in storage positions 46.n, a speech memory 17 with storage positions 44.n, in number equal to the number of time slots in a frame. The control information in the control memory 23 directly controls the storage of user data in the speech memory 17, and time slot counter information corresponding to that generated by means 33 in FIG. 2a controls the cyclical read-out of user data from the speech memory 17.

In practice, it should be understood that this aspect of the invention is applicable to an arbitrary time switch stage for delaying some of the user data through the time switch stage. Consider an arbitrary time switch stage used for switching user data between a first type of time slots and a second type of time slots. As an example, the first time slots may be incoming time slots and the second time slots may be internal time slots. Just as well, the first time slots may be internal time slots and the second time slots outgoing time slots. The speech memory in the time switch stage in question is extended to include two parts, each having storage positions corresponding to a frame, and the control memory of the stage is extended to include control information in form of delay values as well. Furthermore, a delay control unit is provided for generating delay information that controls, for each time slot, to/from (depending on whether the speech memory is provided in an outgoing stage or an incoming stage) which part of the speech memory that user data is to be switched.

It should however be noted that in e.g. broadcasting applications, the invention is applied to the outgoing stage so as to obtain sequence and frame integrity for all subscribers. In that way, the delay control can be performed for each outgoing wideband connection.

In the following description, incoming time slot numbers for a wideband connection are designated by a vector $t_{in}[0,1,2,\ldots W-1]$. W designates the number of time slots for the wideband connection in each frame. Correspondingly, internal time slot numbers are designated by a vector $t_{int}[0,1,2,\ldots W-1]$, and outgoing time slot numbers by a vector $t_{out}[0,1,2,\ldots W-1]$. For simplicity, the incoming time slot numbers appear in consecutive order in the vector $t_{in}[0,1,2,\ldots W-1]$. This order is assumed to be the same as the order in which user data is arranged into incoming time slots.

According to a method for distributing user data belonging to a wideband connection onto internal time slots and outgoing time slots such that Time Slot Sequence Integrity (TSSI) and Time Slot Frame Integrity (TSFI) are preserved, i.e. such that a reciprocal time order between data words that constitute the user data is maintained in switching through the switch, and such that data words appearing in incoming time slots in one and the same frame appear in outgoing time slots in the same frame, an algorithm is used in which the vectors $t_{in}[0,1,2\ldots W-1]$, $t_{int}[0,1,2,\ldots W-1]$ and $t_{out}[0,1,2,\ldots W-1]$ constitute input data. In addition thereto, the algorithm starts from input data in form of a constant $\Delta_{in}$ which designates a difference in phase between frames for incoming time slots and frames for internal time slots, a constant $\Delta_{ut}$ which designates a difference in phase between frames for internal time slots and frames for outgoing time slots, and a constant $C_{frame}$ designating the number of time slots in a frame. The number of time slots W in a frame that belong to the wideband connection is less than or equal to the total number $C_{frame}$ of time slots in a frame. Based on the input data, the algorithm determines distribution information in form of storage positions 45.n, 46.n in the control memories 21, 23 for storing the incoming and the outgoing time slot numbers, respectively, and the storage of the incoming and outgoing time slot numbers in the control memories 21 and 23, respectively, is taken care of in accordance with this distribution information. Furthermore, the algorithm determines distribution information in form of storage positions 47.n, and delay values for writing into the control memory 23 in accordance with this distribution information. Furthermore, the delay values are written into the control memory 23 in the storage positions 47.n in accordance with the distribution information.

In short, the different types of information that are utilized according to the invention may be summarized in the following simplified manner:

control information includes time slot numbers on one hand and delay values on the other hand;

distribution information includes storage positions in the respective control memories for storing the above control information (incoming time slot numbers are stored in 45.n, outgoing time slot numbers are stored in 46.n and delay values are stored in 47.n); and delay information is made up of the information that is generated by the delay control unit and that controls to/from which one of the first and second part of the speech memory that user data is to be switched.

The time slot numbers in the vectors $t_{in}[0,1,2,\ldots W-1]$, $t_{int}[0,1,2,\ldots W-1]$ and $t_{out}[10,1,2,\ldots W-1]$ are generated in the same manner as the time slot numbers for several narrowband connections. The incoming time slot numbers and the outgoing time slot numbers are per se given for a connection by the user terminals between which user data is switched in the connection. The time slot numbers in the vector $t_{int}[0,1,2,\ldots W-1]$ are determined such that no conflict arises in the space switch stage 8. User data that arrives to different incoming time switch stages 5.n and that is to be switched through one and the same outgoing time switch stage 6.n are separated in time such that no conflict occurs in the space switch stage 8. The user data is placed by the incoming time switch stages 5.n into internal time slots in the space switch stage 8. A conflict would arise e.g. if user data for several connections to be switched through one and the same outgoing time switch stage 6.n appear in the same time slots in the space switch stage 8. The time slot numbers in the vectors $t_{in}[0,1,2,\ldots W-1]$, $t_{int}[0,1,2,\ldots W-1]$ and $t_{out}[0,1,2,\ldots W-1]$ are generated in a known manner, and therefore not explained in more detail.

The method for distributing time slot numbers and for determining and distributing delay values will now be described with reference to FIGS. 5–11.

Figure 5:
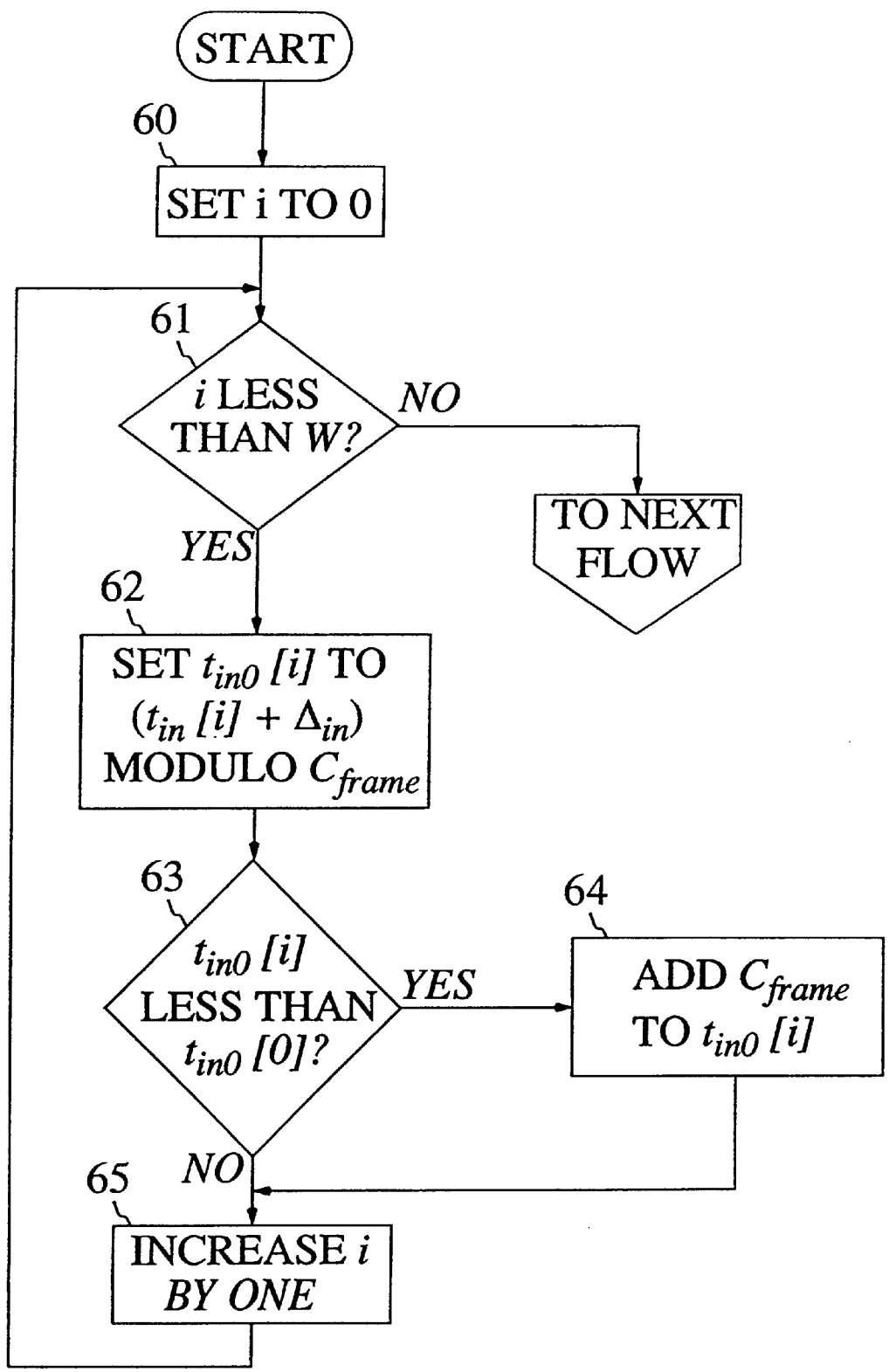
FIG. 5 shows a flow diagram according to the invention describing how incoming time slot numbers are normalized against a time phase of frames for internal time slots.

1. Normalize incoming time slot numbers against a time phase of frames for internal time slots, generating a vector $t_{in0}[0,1,2,\ldots W-1]$. The normalization means that the time slot numbers are regenerated such that the incoming time slot numbers are given relative to frames for the internal time slots. With reference to FIG. 5, determine values of the vector $t_{in0}[0,1,2,\ldots W-1]$. First, initiate a help variable i to 0, i.e. set i=0, see box 60. Next, iterate a sequence including the following steps:

i. Compare the help variable i to W. Interrupt the iteration when i is not less than W, see option box 61.

ii. Store $(t_{in}[i]+\Delta_{in})$ modulo $C_{frame}$ in $t_{in0}[i]$, see box 62.

iii. Compare $t_{in0}[i]$ to $t_{in0}[0]$, see box 63. If $t_{in0}[i]$ is less than $t_{in0}[0]$, add $C_{frame}$ to $t_{in0}[i]$, see box 64.

iv. Add 1 to the help variable i, see box 65.

Values of the vector $t_{in0}[0,1,2, \ldots W-1]$ that exceed the value of $C_{frame}$ indicate that user data belonging to the values is associated with a later frame than user data for which values of the vector $t_{in0}[0,1,2, \ldots W-1]$ are less than the value of $C_{frame}$. The internal time slot numbers are given by $t_{in0}[n]$ modulo $C_{frame}$.

2. Determine a value of a variable δ. The variable δ is an offset-variable which indicates a value that controls the distribution of the user data onto the internal time slots. This so called offset-value decides how user data in the incoming time slots that belong to the wideband connection is to be distributed onto the internal time slots. The way in which the offset-value affects the distribution of the user data will be described in more detail in connection to FIG. 7b. First, create a help vector $t_{int0}[0,1,2, \ldots W-1]$ so that the values in the vector $t_{int}[0,1,2, \ldots W-1]$ are not corrupted. The values of the help vector are given by $$\begin{bmatrix} t_{int0}[0] \\ t_{int0}[1] \\ \vdots \\ t_{int0}[W-1] \end{bmatrix} = \begin{bmatrix} t_{int}[0] \\ t_{int}[1] \\ \vdots \\ t_{int}[W-1] \end{bmatrix}$$

Figure 6:
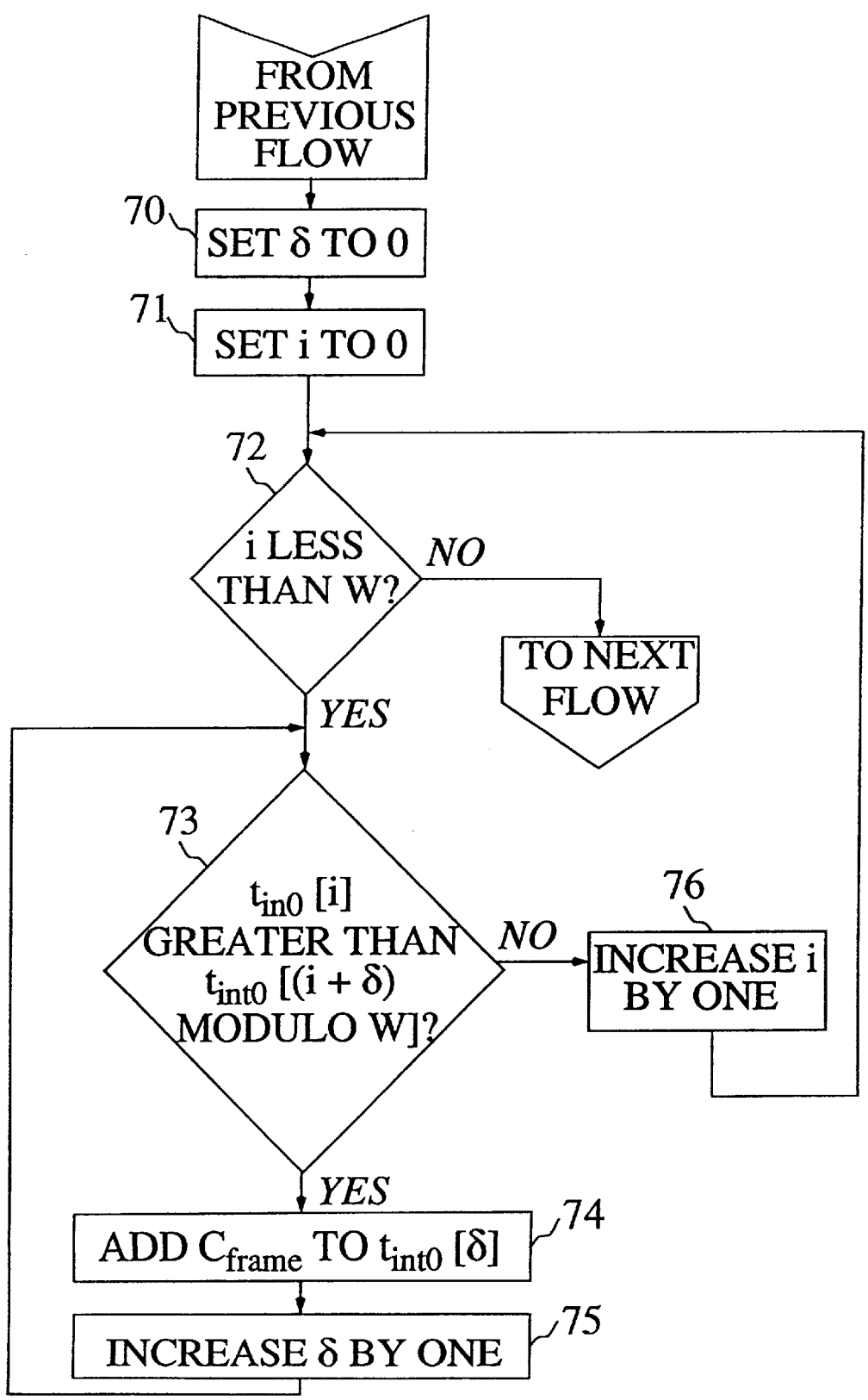
FIG. 6 shows a flow diagram describing how an offset-variable is determined according to the invention.

The values of the vector $t_{int}[0,1,2, \ldots W-1]$ are thus copied to the vector $t_{int0}[0,1,2, \ldots W-1]$. In the following the method manipulates values in the vector $t_{int0}[0,1,2, \ldots W-1]$, whereas the values in the vector $t_{int}[0,1,2, \ldots W-1]$ are kept intact. With reference to FIG. 6, determine the offset-variable δ by first initiating it to 0, i.e. set δ=0, see box 70. Also, initiate a help variable i to 0, i.e. set i=0, see box 71. Iterate a sequence in which the following steps are included:

i. Compare the help variable i to W. Interrupt the iteration when i is not less than W, see box 72.

ii. Iterate a sequence in which the following steps are included:

ii.i Compare $t_{int0}[i]$ to $t_{int0}[(i+\delta)$ modulo $W]$. Interrupt the iteration when $t_{int0}[i]$ is not greater than $t_{int0}[(i+\delta)$ modulo $W]$, see box 73.

ii.ii Add $C_{frame}$ to $t_{int0}[\delta]$, see box 74.

ii.iii Add 1 to the variable δ, see box 75.

iii. Add 1 to the help variable i, see box 76.

Figure 7A:
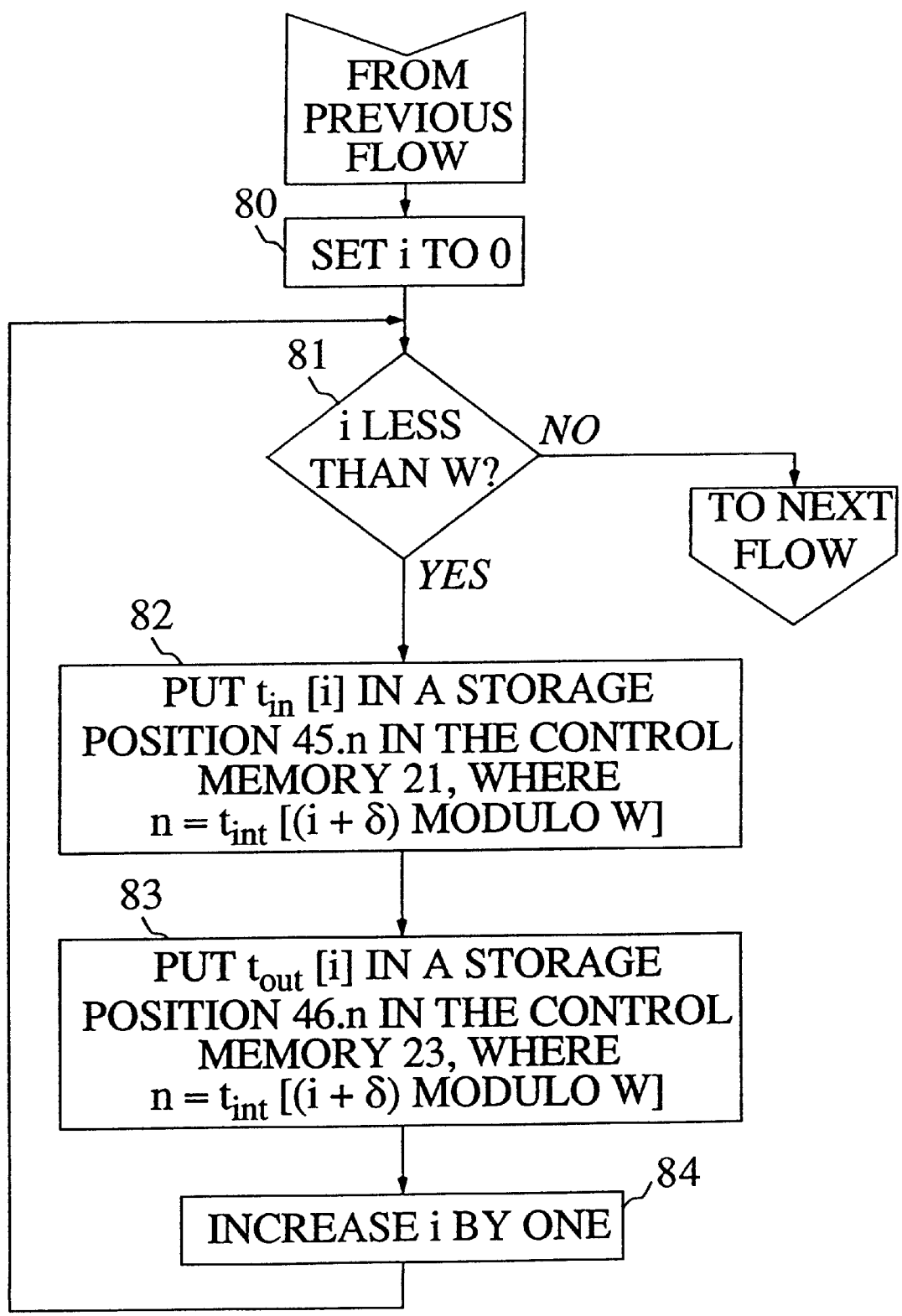
FIG. 7a shows a flow diagram according to the invention describing how distribution information in form of storage positions in the control memories is determined by using the offset-variable.

3. Determine distribution information that is made up of storage positions 45.n, 46.n in the control memories 21 and 23, respectively, by using the offset-variable δ, and store the control information in the storage positions 45.n, 46.n in the control memories 21, 23 in accordance with the distribution information. With reference to FIG. 7a, initiate a help variable to 0, i.e. set i=0, see box 80. Iterate a sequence in which the following steps are included:

i. Compare the help variable i to W. Interrupt the iteration when i is not less than W, see box 81.

ii. Store $t_{in}[i]$ in the control memory 21 in storage position 45.n, where n=$t_{in}[(i+\delta)$ modulo $W]$, see box 82.

iii. Store $t_{out}[i]$ in the control memory 23 in storage position 46.n, where n=$t_{in}[(i+67)$ modulo $W]$, see box 83.

iv. Add 1 to the variable i, see box 84.

FIG. 7b is a schematic diagram showing how different values (0,1 and 2) of the offset-variable δ controls, for each incoming time slot number $t_{in}[i]$ and for each outgoing time slot number $t_{out}[i]$, in which one of the storage positions 45.n and 46.n, respectively, that are given by the internal time slot numbers $t_{int}[0,1,2, \ldots W-1]$ that the incoming time slot number $t_{in}[i]$ and the outgoing time slot number $t_{out}[i]$, respectively, are to be stored. For simplicity, consider 4 time slot numbers for a wideband connection, i.e. W=4.

For δ=0, the incoming time slot numbers $t_{in}[0]$, $t_{in}[1]$, $t_{in}[2]$ and $t_{in}[3]$ will be stored in the positions $45.t_{in}[0]$, $45.t_{in}[1]$, $45.t_{in}[2]$ and $45.t_{in}[3]$, respectively. The storage positions 45.n are determined by the internal time slot numbers that have been assigned to the connection and where the index values directly correspond to the index values associated with the incoming time slot numbers. The same applies to the outgoing time slot numbers and their storage positions 46.n.

For δ=1, the storage positions 45.n and 46.n are determined by the internal time slot numbers that have been assigned to the connection and where the index values are displaced one position relative to the index values associated with the incoming time slot numbers.

For δ=2, the index displacement is two positions.

The steps 1 and 2, and the determination of the storage positions 45.n in step 3 with the following storage of the incoming time slot numbers for the wideband connection in the storage positions 45.n assures that sequence integrity between incoming and internal time slots is preserved. In addition, the offset-value determined in step 2 allows the delay in the time switching between incoming and internal time slots to be minimized. A corresponding procedure is applicable to the time switching between internal and outgoing time slots such that sequence integrity and minimized time switching delay are obtained.

If, in the switching of user data through the complete TST-switch, it is desired to preserve both sequence integrity and frame integrity, the steps 1–7 will be performed, of which the steps 4–7 will be described in the following.

Figure 8:
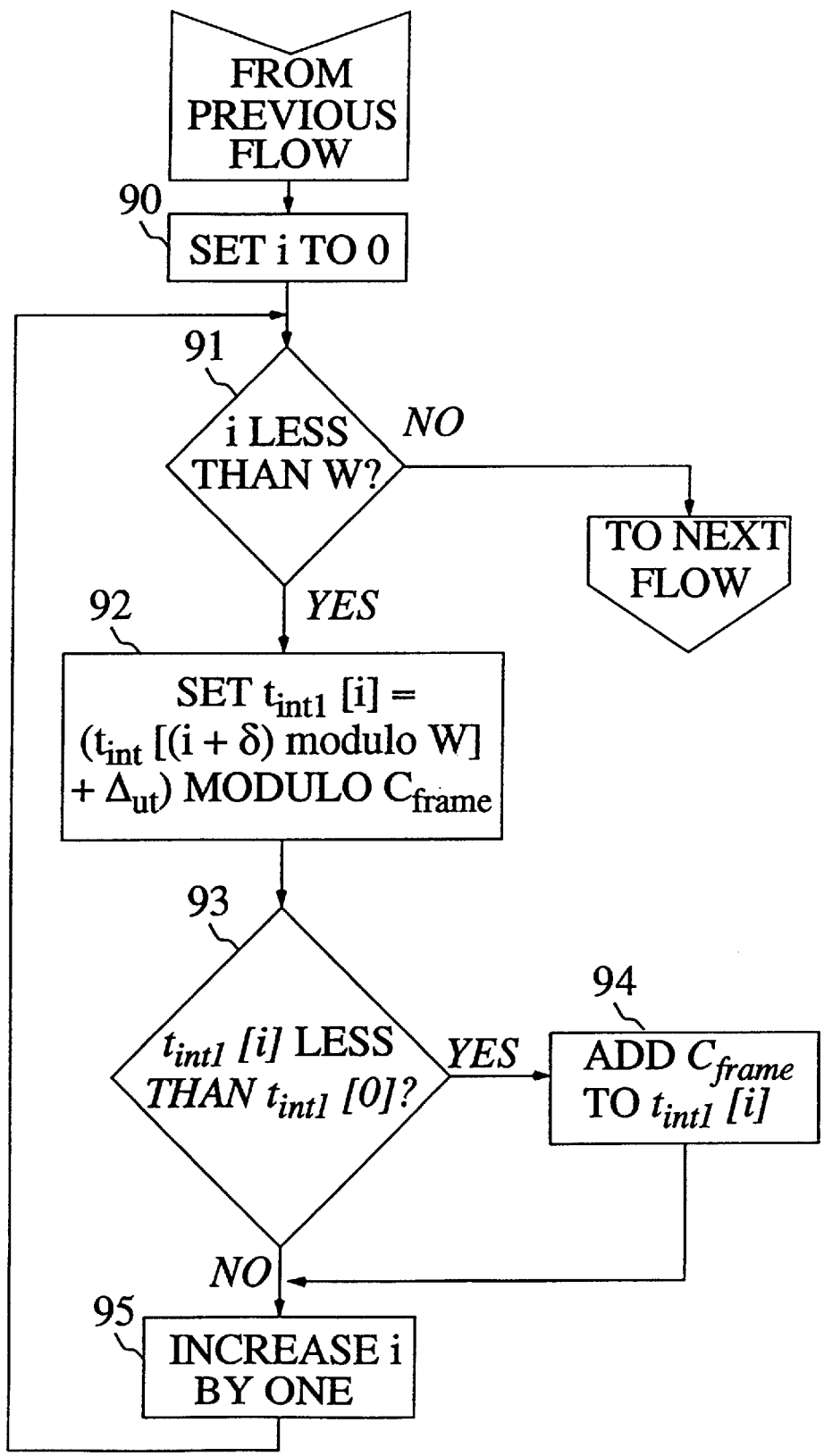
FIG. 8 shows a flow diagram according to the invention describing how internal time slots are normalized against a time phase of frames for outgoing time slots.

4. Normalize the internal time slot numbers, considering how they are distributed in accordance with the distribution information by the offset variable 67, against a time phase of frames for outgoing time slots, generating a vector $t_{int1}[0,1,2, \ldots W-1]$. The normalization means that the time slot numbers are regenerated such that the internal time slots are indicated relative to frames for the outgoing time slots. With reference to FIG. 8, determine values of the vector $t_{int1}[0,1,2, \ldots W-1]$. First, initiate a help variable i to 0, i.e. set i=0, see box 90. Next, iterate a sequence including the following steps:

i. Compare the help variable i to W. Interrupt the iteration when is not less than W, see option box 91.

ii. Store $(t_{in}[(i+\delta)$ modulo $W]+\Delta_{ut})$ modulo $C_{frame}$ in $t_{int1}[i]$, see box 92.

iii. Compare $t_{int1}[i]$ to $t_{int1}[0]$, see box 93. If $t_{int1}[i]$ is less than $t_{int1}[0]$, add $C_{frame}$ to $t_{int1}[i]$, see box 94.

iv. Add 1 to the help variable i, see box 95.

Figure 9:
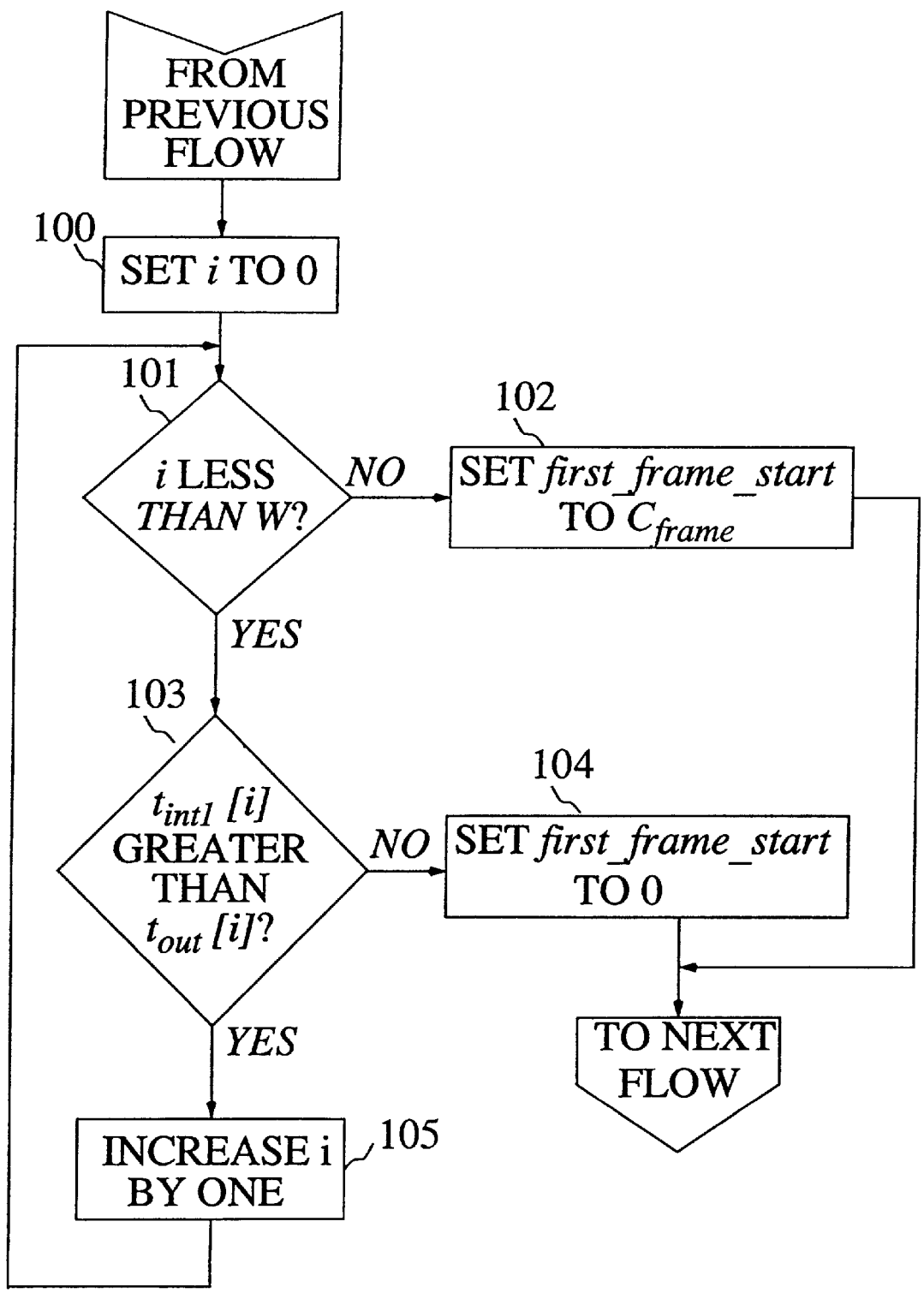
FIG. 9 shows a flow diagram according to the invention describing how a base value is determined.

5. Determine a value of a variable first_frame_start. The value is called base value or frame value and indicates an earliest possible frame in which read-out of user data into outgoing time slots would take place if TSFI is not taken into account. The value of the variable first_frame_start is either 0 or $C_{frame}$. With reference to FIG. 9, set a help variable i to 0, see box 100. Next, iterate a sequence including the following steps:

i. Compare the help variable i to W. When i is not less than W, interrupt the iteration, see option box 101, and set a variable first_frame_start to $C_{frame}$, see box 102.

ii. Compare $t_{int1}[i]$ to $t_{out}[i]$, see option box 103. If $t_{int1}[i]$ is not greater than $t_{out}[i]$, set the variable first_frame_start to the value zero, see box 104.

iii. Add 1 to the help variable i, see box 105.

Figure 10:
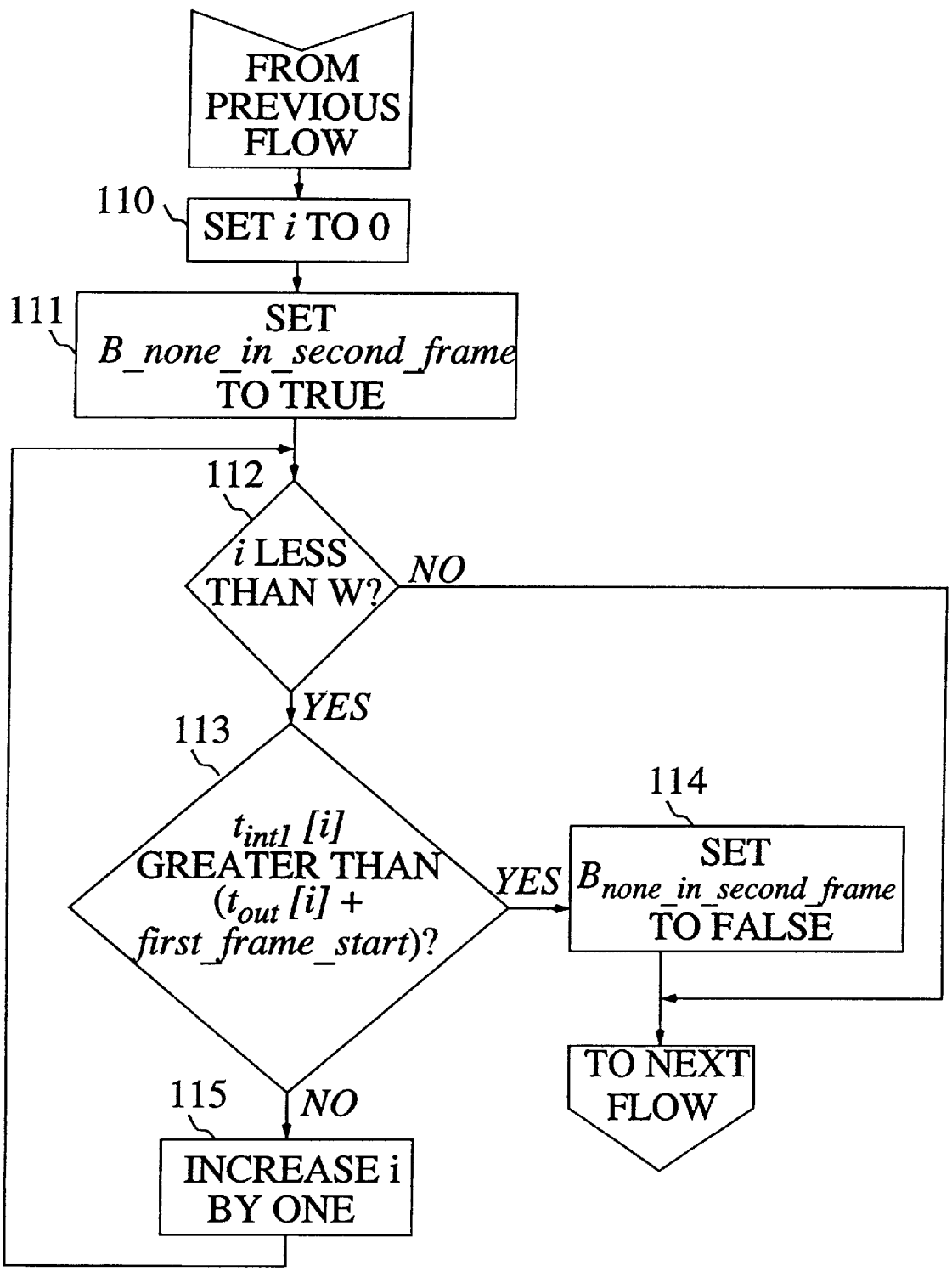
FIG. 10 shows a flow diagram according to the invention describing a determination of whether any time slot is associated with a subsequently following frame relative to the frame represented by the base value.

6. Determine whether any time slot is associated with a subsequently following frame relative to the frame represented by the determined base value (frame value). In this way, it is determined whether or not user data belonging to certain outgoing time slot numbers have to be delayed an extra frame. With reference to FIG. 10, set a help variable i to 0, see box 110, and set a variable B_none_in_second_frame to the value TRUE, see box 111. Next, iterate a sequence including the following steps:

i. Compare the help variable i to W. Interrupt the iteration when i is not less than W, see option box 112.

ii. Compare $t_{int1}[i]$ to $(t_{out}[i]+\text{first\_frame\_start})$, see option box 113. If $t_{int1}[i]$ is greater than $(t_{out}[i]+\text{first\_frame\_start})$, set the variable B_none_in_second_frame to the value FALSE, and then interrupt the iteration, see box 114.

iii. Add 1 to the help variable i, see box 115.

Figure 11:
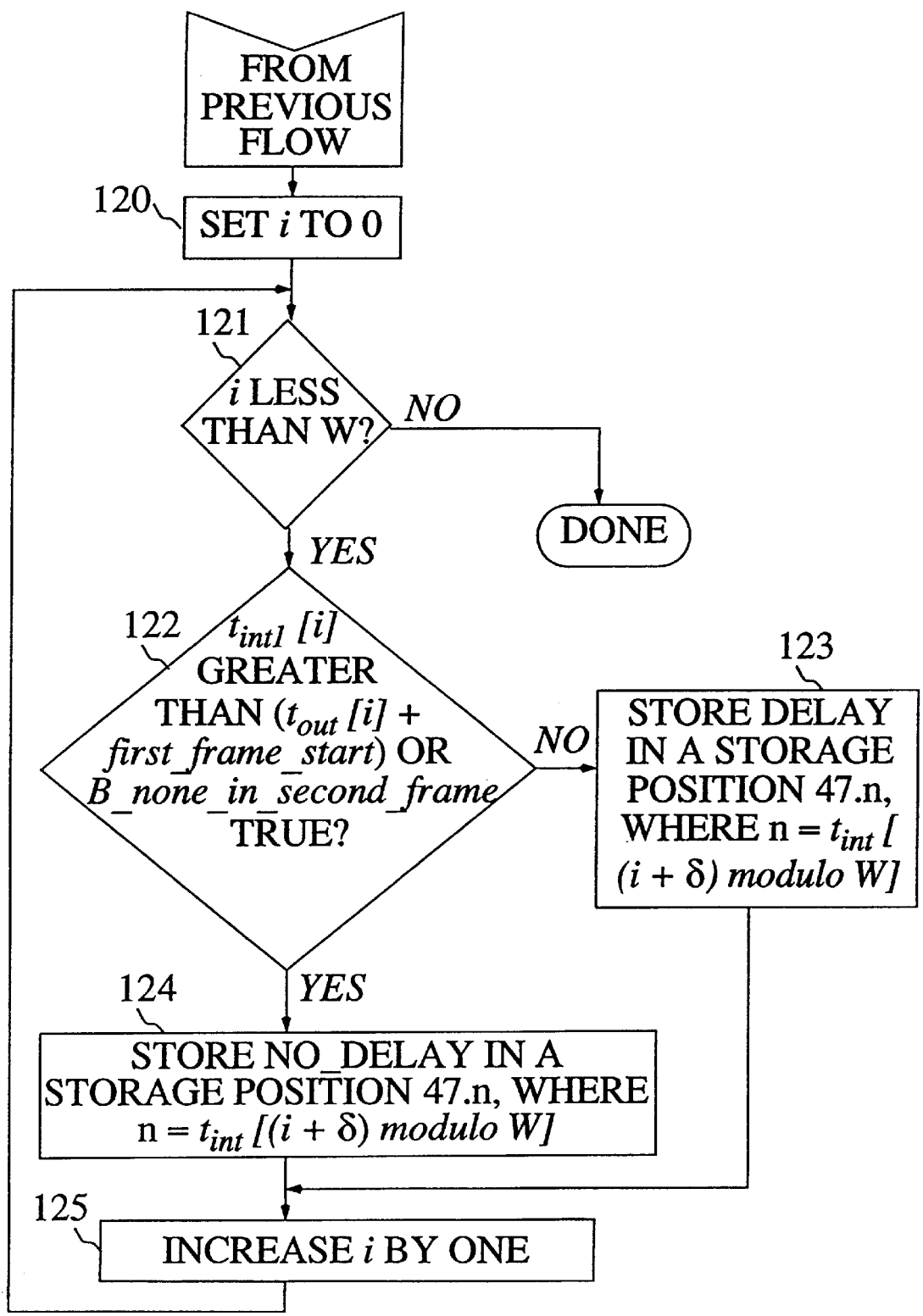
FIG. 11 shows a flow diagram according to the invention describing a determination of control information in form of delay values for respective time slot numbers in frames for outgoing time slots.

7. Determine control information in form of delay values DELAY/NO_DELAY and write these into the storage positions 47.n in the control memory 23. With reference to FIG. 11, set a help variable i to 0, see box 120. Next, iterate a sequence including the following steps:

i. Compare the help variable i to W. Interrupt the iteration when i is not less than W, see option box 121.

ii. Compare $t_{int1}[i]$ to $(t_{out}[i]+\text{first\_frame\_start})$, see box 122. If $t_{int1}[i]$ is not greater than $(t_{out}[i]+\text{first\_frame\_start})$, and the variable B_none_in_second_frame has the value FALSE, store the value DELAY in a storage position 47.n, where $n=t_{int}[(i+\delta) \text{ modulo } W]$, see box 123. DELAY indicates that user data is delayed an extra frame in an outgoing time switch stage 6.n, i.e. DELAY=1. If $t_{int1}[i]$ is greater than $(t_{out}[i]+\text{first\_frame\_start})$, or the variable B_none_in_second_frame has the value TRUE, store the value NO_DELAY in a storage position 47.n, where $n=t_{int}[(i+\delta) \text{ modulo } W]$, see box 124. NO_DELAY indicates that user data is not delayed an extra frame in an outgoing time switch stage 6.n, i.e. NO_DELAY=0.

iii. Add 1 to the help variable i, see box 125.

Preferably, the algorithm is implemented in software executing in a processor such a as microprocessor. This microprocessor (not shown) is by way of example arranged in the control system. The above description of the algorithm is drawn up such that corresponding programming code in programming languages such as C++ will be readily implemented.

In the following, there is shown an illustrative example, according to the invention, of how to configure a TST-switch for a wideband connection such that both sequence and frame integrity are preserved through the switch. Consider a wideband connection of three channels. Thus W=3. The total number of time slots in a frame $C_{frame}$ is 512. The control system 2 receives a request for establishing the three channel wideband connection from the incoming time slots $t_{in}=\{15, 243, 372\}$ to the outgoing time slots $t_{out}=\{36, 167, 221\}$. Idle internal time slots for switching data are $t_{int}=\{183, 327, 378\}$. The difference in phase between frames for incoming time slots and frames for internal time slots is $\Delta_{in}=13$. The difference in phase between frames for internal time slots and frames for outgoing time slots is $\Delta_{ut}=-276$.

Figure 12:
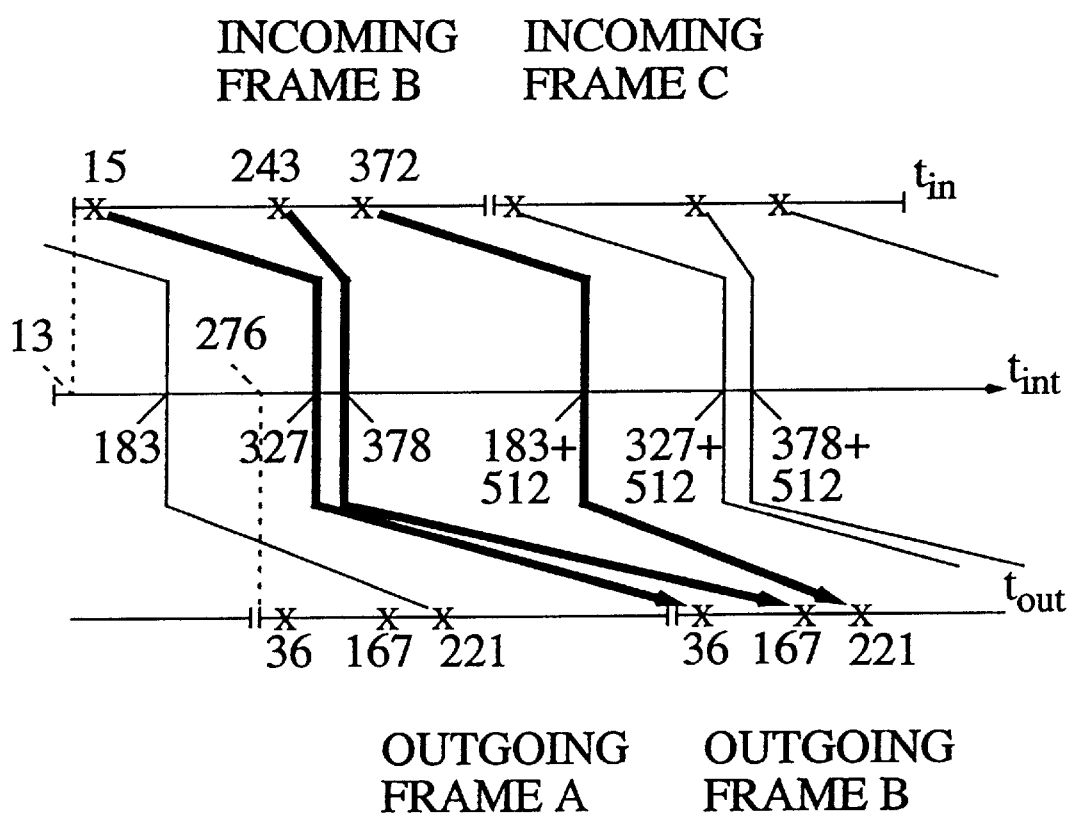
FIG. 12 is a diagram of frames of incoming time slots, internal time slots and frames of outgoing time slots, schematically showing how user data in the incoming time slots are distributed onto the internal time slots and the outgoing

FIG. 12 is a diagram of frames of incoming time slots, internal time slots and frames of outgoing time slots schematically showing how user data in the incoming time slots are distributed onto the internal time slots and the outgoing time slots according to this example. The phase differences $\Delta_{in}=13$ and $\Delta_{out}=-276$ are indicated by dotted lines. The time slot numbers 15, 243, 372 indicate positions in an incoming frame, whereas the positions of the X:s indicate the time instances when the time slots arrive relative to the time axis $t_{int}$. The time slot numbers 36, 167, 221 indicate positions in an outgoing frame, whereas the positions of the X:s indicate time instances for read-out into an outgoing frame relative to the time axis $t_{int}$.

A processor in the control system 2 executes the algorithm according to the invention starting from the values of the input parameters given above.

1. The incoming time slot numbers are normalized against internal frames in accordance with the flow diagram of FIG. 5. The help vector of normalized incoming time slot numbers $t_{in0}$ then becomes {28, 256, 385}.

2. A value of the offset-variable 67 is determined in accordance with the flow diagram of FIG. 6. The offset-value then becomes $\delta=1$.

3. Distribution information in form of storage positions 45.n and 46.n in the control memories 21 and 23, respectively, is determined in accordance with the flow diagram of FIG. 7a. The result is that the control information {372, 15, 243} is put in control memory 21 in the positions 45. {183, 327, 378}, and the control information {221, 36, 167} is put in control memory 23 in the positions 46. {183, 327, 378}. Since $\delta=1$, the incoming time slot numbers and the outgoing time slot numbers are displaced one position in the respective control memories. As an example, the incoming time slot number 15 will end up in position 45.327 instead of in 45.183, the incoming time slot number 243 in position 45.378 instead of in 45.327 and the incoming time slot number 372 in position 45.183 (+512) instead of in 45.378.

4. The internal time slot numbers are normalized against outgoing frames with consideration to the offset-variable in accordance with the flow diagram of FIG. 8. The help vector of normalized internal time slot numbers $t_{int1}$ then becomes {51, 102, 419}.

5. The base value variable first_frame_start is determined in accordance with the flow diagram of FIG. 9. The value of this base value variable represents the outgoing frame to which the fastest incoming time slot could be switched to without consideration to frame integrity correcting mechanisms. According to the distribution information determined in step 3 with consideration to the offset value 1, data in incoming time slot 15 can be switched to internal time slot 327 and then at the earliest switched for read-out to time slot 36 in the outgoing frame B. With regard to time, it is not possible to switch this data for read-out to time slot 36 in the outgoing frame A. However, it is possible to switch user data from incoming time slot 243 to internal time slot 378 and on to outgoing time slot 167 in the outgoing frame A. In this way, first_frame_start gets the value zero, which represents the outgoing frame A.

6. In accordance with the flow diagram of FIG. 10, it is determined whether any time slot is associated with a subsequently following frame relative to the frame represented by the base value zero. In other words, whether there is any incoming time slot, the data of which is switched to the outgoing frame B. From FIG. 12 it can be seen that data in the incoming time slots 15 and 372, with regard to time, have to be switched to the outgoing frame B. Consequently, the variable B_none_in_second_frame gets the value FALSE.

7. Control information in form of delay values is determined and stored in the positions 47.n in the control memory 23 in accordance with the flow diagram of FIG. 11. NO_DELAY is stored in the storage positions 47.183 and 47.327, and DELAY is stored in the storage position 47.378. In practice, this means that user data from the incoming time slot 243 that is switched to the internal time slot 378 is delayed one frame such that this data is not read out in time slot 167 in outgoing frame A, but instead is read out in time slot 167 in outgoing frame B.

In this way, the switch is set up such that such that both sequence and frame integrity are preserved through the switch for the desired wideband connection. Data in the incoming time slots 15, 243, 372 in incoming frame B are read out in the same reciprocal order in time slots 36, 167, 221 in outgoing frame B.

The control information in the positions 45.n and 46.n makes sure that user data is switched such that sequence integrity is preserved. The control information in the positions 46.n and 47.n are read out to the delay control unit 26 which generates delay information. This delay information controls, for each internal time slot, to which one of the first 48 and the second part 49 of the speech memory 17 in the outgoing time switch stage 6.n that user data in the internal time slot is to be switched. In this way, the delay information controls whether user data is to appear in a first possible frame of outgoing time slots or be delayed an extra frame.

The above embodiments of the invention are merely examples of how the inventive concept can be realized and the invention is not limited thereto. It is possible to embody the invention in specific forms other than those described without departing from the spirit and the basic principles of the invention.

As an example, the time slot counter circuit 28 may be realized by three separate counters that more or less directly generate the counter values and phase values, respectively, that are outputted at the outputs 29, 30 and 31 in FIG. 3.

The algorithm can easily be modified such that it works even if the extended speech memory is provided in an incoming time switch stage.

Furthermore, the given algorithm can be modified such that it may be used with a hardware configuration different from that which is shown.

The present invention is defined by the appended patent claims, and further modifications and improvements which retain the basic principles described and claimed herein are within the scope of the invention.

What is claimed is:

1. A method for switching user data belonging to a wideband connection and appearing in a subset W of first time slots in a frame of first time slots to a corresponding subset W of second time slots in a frame of second time slots by storing and reading these user data in and from a speech memory, the positions for read-out from said speech memory being determined by time slot numbers in a control memory, said subset of first time slots being associated with first time slot numbers $t_{in}[0,1, \ldots W-1]$ and said subset of second time slots being associated with second time slot numbers $t_{in}[0,1, \ldots W-1]$, characterized in that it further comprises the step of determining distribution information in form of storage positions in said control memory for storing said first time slot numbers $t_{in}[0,1, \ldots W-1]$, by determining an offset $\delta$ which controls, for each first time slot number $t_{in}[i]$, in which one of the positions in said control memory that are given by said second time slot numbers $t_{in}[0,1, \ldots W-1]$ that the first time slot number $t_{in}[i]$ is to be stored, and storing the first time slot number $t_{in}[i]$ in the determined position.

2. A method according to claim 1, characterized in that the determination of said distribution information further comprises the steps of:

normalizing said first time slot numbers $t_{in}[0,1, \ldots W-1]$ against a time phase of frames for said second time slots such that said first time slots are indicated relative to frames for said second time slots;

determining, from said normalized first time slot numbers $t_{in0}[0,1 \ldots W-1]$ and said second time slot numbers $t_{in}[0,1, \ldots W-1]$, said offset $\delta$ controlling the distribution of user data in said subset of first time slots onto said subset of second time slots; and wherein said controlling of position, for each first time slot number $t_{in}[i]$, is based on at least one of said second time slot numbers $t_{in}[0,1, \ldots W-1]$, the determined offset $\delta$ and the number of time slots W for said wideband connection in a frame.

3. A method according to claim 2, characterized in that said normalization of said first time slot numbers $t_{in}[0,1, \ldots W-1]$ includes, for each first time slot number $t_{in}[i]$, the steps of:

determining a sum of said first time slot number $t_{in}[i]$ and the phase difference $\Delta_{in}$ between frames for said first time slots and frames for said second time slots;

determining an initial value of a normalized first time slot number $t_{in0}[i]$ by performing a modulo operation between the determined sum and the total number $C_{frame}$ of time slots in a frame;

comparing the first one of said initial values with the current determined initial value; and selectively adding a value corresponding to the total number $C_{frame}$ of time slots in a frame to the initial value of said normalized first time slot number $t_{in0}[i]$ in dependence on the result of said comparison to generate a second normalized first time slot number $t_{in0}[i]$ associated with said first time slot number $t_{in}[i]$.

4. A method according to claim 2, characterized in that said determination of said offset $\delta$ comprises an iterative process that includes a comparison based on said normalized first time slot numbers $t_{in0}[0,1, \ldots W-1]$ and said second time slot numbers $t_{in0}[0,1, \ldots W-1]$, and a selective increase of said offset $\delta$ in dependence on the result of said comparison.

5. A method according to claim 4, characterized in that each iteration in said iterative process comprises:

a comparison of a normalized first time slot number $t_{in0}[i]$ and one, depending on the current value of said offset $\delta$ and the number of time slots W for said wideband connection in a frame, of said second time slot numbers $t_{in0}[0,1, \ldots W-1]$; and a selective adding of the total number $C_{frame}$ of time slots in a frame to that of the second time slot numbers $t_{in0}[0,1, \ldots W-1]$ that is indicated by the current value of said offset $\delta$ as index in dependence on the result of said comparison.

6. A method according to claim 2, characterized in that said control memory position, for each first time slot number $t_{in}[i]$, is given by the following expression:

$$t_{in}[(i+\delta) \text{modulo } W].$$

7. A method according to claim 1, wherein said first time slots correspond to time slots arriving to a switch stage, and said second time slots correspond to time slots going out from said switch stage.

8. A device for switching user data belonging to a wideband connection and appearing in a subset of first time slots in a frame of first time slots to a corresponding subset of second time slots in a frame of second time slots, having:

a speech memory for storing and reading these user data; and a control memory for storing time slot numbers, the positions in said speech memory being determined by said time slot numbers in said control memory, said subset of first time slots being associated with first time slot numbers $t_{in}[0,1, \ldots W-1]$ and said subset of second time slots being associated with second time slot numbers $t_{int}[0,1, \ldots W-1]$, characterized in that it further comprises:

means for determining distribution information in form of storage positions in said control memory for storing said first time slot numbers $t_{in}[0,1, \ldots W-1]$ by determining an offset which controls, for each first time slot number $t_{in}[i]$, in which one of the positions in said control memory given by said second time slot numbers $t_{int}[0,1 \ldots W-1]$ that the first time slot number $t_{in}[i]$ is to be stored, and for storing the first time slot number $t_{in}[i]$ in the determined position.

9. A method for switching user data belonging to a wideband connection and appearing in a subset W of incoming time slots in a frame of incoming time slots to a corresponding subset W of internal time slots in a frame of internal time slots and a corresponding subset W of outgoing time slots in a frame of outgoing time slots, by storing and reading these user data in and from speech memories, the positions in said speech memories being determined by time slot numbers in respective control memories, said subset of incoming time slots, said subset of internal time slots and said subset of outgoing time slots being associated with incoming time slot numbers $t_{in}[0,1, \ldots W-1]$, internal time slot numbers $t_{int}[0,1, \ldots W-1]$ and outgoing time slot numbers $t_{out}[0,1, \ldots W-1]$, respectively, characterized in that it further comprises the steps of:

determining distribution information in form of storage positions in the respective control memories for storing said incoming time slot numbers $t_{in}[0,1, \ldots W-1]$ and said outgoing time slot numbers $t_{out}[0,1, \ldots W-1]$, respectively;

normalizing said internal time slot numbers $t_{int}[0,1, \ldots W-1]$ against a time phase of frames for said outgoing time slots such that said internal time slots are indicated relative to frames for said outgoing time slots;

determining a frame value representing the outgoing frame in which read-out of user data could be done at the earliest;

determining whether any outgoing time slot of said connection is associated with a subsequently following frame relative to the frame represented by said determined frame value; and determining control information DELAY/NO_DELAY which controls whether user data is to appear in a first possible outgoing frame or be delayed an extra frame, based on said normalized internal time slot numbers $t_{int1}[0,1, \ldots W-1]$, said outgoing time slot numbers $t_{out}[0,1, \ldots W-1]$, said determined frame value and the determination of the association with a subsequently following frame.

10. A method according to claim 9, characterized in that the determination of said distribution information comprises the steps of:

normalizing said incoming time slot numbers $t_{in}[0,1, \ldots W-1]$ against a time phase of frames for said internal time slots such that said incoming time slots are indicated relative to frames for said internal time slots;

determining, from said normalized incoming time slot numbers $t_{in0}[0,1, \ldots W-1]$ and said internal time slot numbers $t_{int}[0,1, \ldots W-1]$, an offset δ which decides the distribution of user data in said subset of incoming time slots onto said subset of internal time slots and onto said subset of outgoing time slots;

determining, for each incoming time slot number $t_{in}[i]$ and each outgoing time slot number $t_{out}[i]$, in which of the storage positions in the respective control memories that are indicated by the internal time slot numbers $t_{int}[0,1, \ldots W-1]$, that the incoming time slot number $t_{in}[i]$ and the outgoing time slot number $t_{out}[i]$, respectively, are to be stored, based on said internal time slot numbers $t_{int}[0,1, \ldots W-1]$, said offset δ and the number of time slots W for said wideband connection in a frame, and storing the incoming time slot number $t_{in}[i]$ and the outgoing time slot number $t_{out}[i]$ in the determined position in the respective control memory.

11. A method according to claim 10, characterized in that said normalization of said incoming time slot numbers $t_{in}[0,1, \ldots W-1]$ comprises, for each incoming time slot number $t_{in}[i]$, the steps of:

determining a sum of the incoming time slot number $t_{in}[i]$ and the phase difference $\Delta_{in}$ between frames for said incoming time slots and frames for said internal time slots;

determining an initial value of a normalized incoming time slot number $t_{in0}[i]$ by performing a modulo-operation between said determined sum and the total number $C_{frame}$ of time slots in a frame;

comparing the first one of said initial values to the current determined initial value; and selectively adding a value corresponding to the total number $C_{frame}$ of time slots in a frame to the initial value of the normalized incoming time slot number $t_{in0}[i]$ in dependence on the result of said comparison of initial values to generate an updated normalized incoming time slot number $t_{in0}[i]$ associated with the incoming time slot number $t_{in}[i]$.

12. A method according to claim 10, characterized in that the determination of said offset δ comprises an iterative process that includes a comparison based on said normalized incoming time slot numbers $t_{in0}[0,1, \ldots W-1]$ and said internal time slot numbers $t_{int0}[0,1, \ldots W-1]$ and a selective increase of said offset δ in dependence of the result of said comparison.

13. A method according to claim 12, characterized in that each iteration in said iterative process comprises:

a comparison of a normalized incoming time slot number $t_{in0}[i]$ and one, depending on the current value of said offset δ and the number of time slots W for said wideband connection in a frame, of said internal time slot numbers $t_{int0}[0,1, \ldots W-1]$; and a selective adding of the total number $C_{frame}$ of time slots in a frame to that of the internal time slot numbers $t_{int0}[0,1, \ldots W-1]$ that is indicated by the current value of said offset δ as index in dependence on the result of said comparison.

14. A method according to claim 10, characterized in that said control memory position, for each incoming time slot number $t_{in}[i]$ and each outgoing time slot number $t_{out}[i]$, in the respective control memories is given by the following expression:

$t_{int}[(i+\delta) \text{modulo } W]$.

15. A method according to claim 9, characterized in that the normalization of said internal time slot numbers $t_{int}[0,$ 1, ... W−1] comprises, for each internal time slot number $t_{int}[i]$, the steps of:
  determining an initial value of a normalized internal time slot number $t_{int1}[i]$ according to the following formula:

$$(t_{int}[(i+\delta) \bmod W] + \Delta_{ut}) \bmod C_{frame},$$

where $\Delta_{ut}$ represents the phase difference between frames for said internal time slots and frames for said outgoing time slots;
  comparing the initial value associated with the first normalized internal time slot number $t_{int1}[0]$ to the current determined initial value; and
  selectively adding a value corresponding to the total number $C_{frame}$ of time slots in a frame to the initial value of the normalized internal time slot number $t_{int1}[i]$ in dependence on the result of the comparison of initial values to generate an updated normalized internal time slot number $t_{int1}[i]$ associated with the internal time slot number $t_{int}[i]$.

16. A method according to claim 9, characterized in that the determination of said frame value includes comparing said normalized internal time slot numbers $t_{int1}[0,1, ... W−1]$ and said outgoing time slot numbers $t_{out}[0,1, ... W−1]$.

17. A method according to claim 9, characterized in that the determination of whether any outgoing time slot is associated with a subsequently following frame relative to the frame represented by said determined frame value is based on a comparison, for each normalized internal time slot number, between the normalized internal time slot number and a sum of the corresponding outgoing time slot number and the determined frame value.

18. A method according to claim 9, characterized in that it further comprises the step of determining an offset δ which controls the distribution of user data between the different time slots such that sequence integrity is preserved between the different time slots;
  that the control memory for storing outgoing time slot numbers $t_{out}[0,1, ... W−1]$ includes a further part for storing control information in form of delay values DELAY/NO_DELAY,
  said method further comprising the steps of determining, for each delay value DELAY/NO_DELAY, in which one of the storage positions in said further part of the control memory that correspond to said internal time slot numbers $t_{int}[0,1, ... W−1]$ that the delay value is to be stored, based on said internal time slot numbers $t_{int}[0,1, ... W−1]$, said offset δ and the number of time slots W for the wideband connection in a frame, and storing the delay value in the determined position.

19. A method according to claim 9, characterized in that the control information is given in form of delay values, and that a delay value takes a value NO_DELAY which indicates that delay is not to be performed if the corresponding normalized internal time slot number $t_{int1}[i]$ is greater than a sum of the corresponding outgoing time slot number $t_{out}[i]$ and said determined frame value or if no outgoing time slot is associated with a subsequently following frame relative to the frame represented by said determined frame value, otherwise the delay value takes a value DELAY which indicates that delay is to be performed.

20. A method according to claim 9, characterized in that the speech memory for storing outgoing time slots comprises a first part (48) and a second part (49), each of which has storage positions that, in number, correspond to the number of time slots in a frame, said first part (48) corresponding to a first frame of outgoing time slots and said second part (49) corresponding to a following second frame of outgoing time slots; and
  that said method further comprises the step of determining delay information based on at least said outgoing time slot numbers $t_{out}[0,1, ... W−1]$ and the determined control information in form of delay values DELAY/NO_DELAY, said delay information controlling, for each internal time slot of said subset W of internal time slots, to which one of said first part (48) and said second part (49) of the speech memory that user data in the internal time slot is to be switched.

21. A device for switching user data belonging to a wideband connection and appearing in a subset of incoming time slots in a frame of incoming time slots to a corresponding subset of internal time slots in a frame of internal time slots and a corresponding subset of outgoing time slots in a frame of outgoing time slots, having speech memories for storing and reading these user data, and control memories for storing time slot numbers, the positions in said speech memories being determined by the time slot numbers in the respective control memories, said subset of incoming time slots, said subset of internal time slots and said subset of outgoing time slots being associated with incoming time slot numbers $t_{in}[0,1, ... W−1]$, internal time slot numbers $t_{int}[0,1, ... W−1]$ and outgoing time slot numbers $t_{out}[0,1, ... W−1]$, respectively, characterized in that it further comprises:
  means for determining distribution information in form of storage positions in the respective control memories for storing said incoming time slot numbers $t_{in}[0,1, ... W−1]$ and said outgoing time slot numbers $t_{out}[0,1 ... W−1]$, respectively;
  means for normalizing said internal time slot numbers $t_{int}[0,1, ... W−1]$ against a time phase of frames for said outgoing time slots such that said internal time slots are indicated relative to frames for said outgoing time slots;
  means for determining a frame value representing the outgoing frame in which read-out of user data could be done at the earliest;
  means for determining whether any outgoing time slot of said connection is associated with a subsequently following frame relative to the frame represented by said determined frame value; and
  means for determining control information in form of delay values DELAY/NO_DELAY which controls whether user data is to appear in a first possible frame or be delayed an extra frame, based on said normalized internal time slot numbers $t_{int1}[0,1, ... W−1]$, said outgoing time slot numbers $t_{out}[0,1, ... W−1]$, said determined frame value and the determination of the association with a following frame.

22. A device according to claim 21, characterized in that the control memory for storing outgoing time slot numbers includes a further part for storing said control information in form of delay values, said device further comprising:
  means for determining an offset δ which controls the distribution of user data between the different time slots such that sequence integrity is preserved between the different time slots;
  means for determining, for each delay value, in which one of the storage positions in said further part of the control memory that correspond to said internal time slot numbers $t_{int}[0,1, ... W−1]$ that the delay value DELAY/NO_DELAY is to be stored, based on said internal time slot numbers $t_{int}[0,1,\ldots W-1]$, said offset $\delta$ and the number of time slots W for the wideband connection in a frame, and for storing the delay value in the determined position.

23. A device according to claim 21, characterized in that the speech memory for storing outgoing time slots comprises a first part (48) and a second part (49), each of which has storage positions that, in number, correspond to the number of time slots in a frame, said first part (48) corresponding to a first frame of outgoing time slots and said second part (49) corresponding to a following second frame of outgoing time slots; and that said device further comprises a delay control unit for generating delay information based on at least said outgoing time slot numbers $t_{out}[0,1,\ldots W-1]$ and said determined delay values DELAY/NO_DELAY, said delay information controlling, for each internal time slot of said subset W of internal time slots, to which one of said first part (48) and said second part (49) of the speech memory that user data in the internal time slot is to be switched.

24. A device according to claim 21, characterized in that said means for determining said distribution information comprises:

means for normalizing said incoming time slot numbers against a time phase of frames for said internal time slots such that said incoming time slots are indicated relative to frames for said internal time slots;

means for determining, from said normalized incoming time slot numbers and said internal time slot numbers, an offset $\delta$ which decides the distribution of user data in said subset of incoming time slots onto said subset of internal time slots and said subset of outgoing time slots;

means for determining, for each incoming time slot number and each outgoing time slot number, in which of the storage positions in the respective control memories that are given by the internal time slot numbers that the incoming time slot number and the outgoing time slot number, respectively, are to be stored, based on said internal time slot numbers, said offset and the number of time slots for the wideband connection in a frame, and for storing the incoming time slot number $t_{in}[i]$ and the outgoing time slot number $t_{out}[i]$ in the determined position in the respective control memories.

* * * * *